(12) United States Patent
Maruko et al.

(10) Patent No.: US 6,604,042 B2
(45) Date of Patent: Aug. 5, 2003

(54) BRAKING CONTROL SYSTEM WITH OBJECT DETECTION SYSTEM INTERACTION

(75) Inventors: Naoki Maruko, Kanagawa (JP); Minoru Tamura, Yokohama (JP); Hideaki Inoue, Yokohama (JP); Takayuki Watanabe, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/988,274

(22) Filed: Nov. 19, 2001

(65) Prior Publication Data

US 2002/0091479 A1 Jul. 11, 2002

(30) Foreign Application Priority Data

Jan. 9, 2001 (JP) ........................................ 2001-001930

(51) Int. Cl.[7] .............................. G01S 13/93; G08G 1/16
(52) U.S. Cl. ........................ 701/96; 701/301; 340/435; 340/436; 340/444; 340/465; 340/903; 180/170
(58) Field of Search ............................ 701/96, 93, 301, 701/97, 98, 41; 340/904, 901, 903, 902, 435, 436, 441, 444, 465; 342/70, 71, 455, 107, 109, 113, 114, 133; 180/170, 171, 172, 167

(56) References Cited

U.S. PATENT DOCUMENTS

| 5,710,565 | A | * | 1/1998 | Shirai et al. ................... 342/70 |
| 5,871,062 | A | * | 2/1999 | Desens et al. ............... 180/169 |
| 5,904,215 | A | * | 5/1999 | Ikeda .......................... 180/169 |
| 5,955,967 | A | * | 9/1999 | Yamada ....................... 340/904 |
| 6,026,347 | A | * | 2/2000 | Schuster ...................... 701/301 |
| 6,195,157 | B1 | * | 2/2001 | Yamashita et al. .......... 180/169 |
| 6,265,990 | B1 | * | 7/2001 | Isogai et al. ................. 340/903 |
| 6,269,298 | B1 | * | 7/2001 | Seto ............................. 701/96 |
| 6,275,772 | B1 | * | 8/2001 | Sugimoto et al. ........... 701/301 |
| 6,311,119 | B2 | * | 10/2001 | Sawamoto et al. ........... 701/96 |
| 6,311,123 | B1 | * | 10/2001 | Nakamura et al. ............ 701/96 |
| 6,317,693 | B2 | * | 11/2001 | Kodaka et al. .............. 701/301 |
| 6,339,740 | B1 | * | 1/2002 | Seto et al. ..................... 701/96 |
| 2001/0020217 | A1 | * | 9/2001 | Matsuno ...................... 701/301 |

FOREIGN PATENT DOCUMENTS

| JP | 5-058257 | 3/1993 |
| JP | 5-242396 | 9/1993 |
| JP | 2000-247161 | 8/2000 |
| JP | 2001-233189 | 8/2001 |

OTHER PUBLICATIONS

U.S. patent application Ser. No. 10/049,565, Maruko et al., filed Feb. 15, 2002.
U.S. patent application Ser. No. 09/789,010 filed Feb. 2001, Manuko et al., Class 701 Subclass 70.

* cited by examiner

*Primary Examiner*—Thomas G. Black
*Assistant Examiner*—Tuan C To
(74) *Attorney, Agent, or Firm*—Foley & Lardner

(57) ABSTRACT

A braking control system includes an object detector, a host vehicle speed sensor, and a control unit configured to be electronically connected to at least the object detector and the host vehicle speed sensor for automatically controlling, depending on a host vehicle speed and a relative distance, a braking force needed for an automatic braking operation, containing preliminary braking control and supplementary braking control, without driver's braking action when a host vehicle is approaching a frontally positioned object. The control unit detects the presence or absence of a driver's intention for lane-changing. In the presence of the driver's intention for lane-changing, the preliminary braking control initiated prior to the driver's braking action is inhibited or the degree of limitation on the supplementary braking control, through which a value of a controlled quantity is brought closer to a target deceleration rate needed for collision-avoidance, is reduced.

24 Claims, 13 Drawing Sheets

BRAKING CONTROL SYSTEM WITH OBJECT DETECTION SYSTEM INTERACTION

TECHNICAL FIELD

The present invention relates to an automatic braking control system with object detection system interaction, and particularly to techniques for automatic braking control according to which a braking system is activated automatically without any driver's braking action when a host vehicle is closing on a frontally-located obstacle or a vehicle ahead.

BACKGROUND ART

In recent years, there have been proposed and developed various braking control systems that determine a possibility of collisions based on both a relative distance between a host vehicle and an object, such as an obstacle in front and a preceding vehicle running ahead of the host vehicle, and a relative velocity of the host vehicle to the preceding vehicle, for the purpose of automatic activation of a braking system, collision avoidance, slippage control of steered wheels, or the like. Japanese Patent Provisional Publication No. 5-242396 has disclosed an active safety system which determines that the possibility of a collision is low when a relative velocity to the preceding vehicle is below a predetermined threshold value and an acceleration value of a host vehicle is above a predetermined acceleration value, and thus prevents a braking system from being undesirably activated automatically when the host vehicle is passing the preceding vehicle. Japanese Patent Provisional Publication No. 5-58257 has disclosed a steered-wheel slippage control system which reduces a braking force or sets the braking force to zero in order to prevent undesirable slippage of steered road wheels when the road wheels are steered during an automatic braking mode. Japanese Patent Provisional Publication No. 2001-233189 has disclosed an automatic preview braking control system capable of generating a minute braking pressure (that is, pre-application of the brakes) based on a vehicle running state when an anti-skid braking system (ABS) electronic control unit (ECU) determines that the preliminary braking pressure application is required as a preview. Assuming that the possibility of a collision is merely determined based on both a relative velocity of a host vehicle to a preceding vehicle and an acceleration rate of the host vehicle, there is a possibility that the operating mode of the braking system cannot be shifted to an automatic braking mode under a particular condition where the host vehicle is approaching the preceding vehicle due to driver's inattentive driving during which the relative velocity is below the predetermined threshold value and the time rate of change in the host-vehicle speed exceeds the predetermined acceleration value. On the other hand, in the system that the braking force is reduced depending on whether road wheels are steered, there is an increased tendency for a shift to the automatic braking mode to be inhibited even during cornering wherein the automatic braking is required.

SUMMARY OF THE INVENTION

Accordingly, it is an object of the invention to provide an automatic braking control system with object detection system interaction, which avoids the aforementioned disadvantages.

It is another object of the invention to provide an automatic braking control system with object detection system interaction, which is capable of precisely determining the presence or absence of a driver's intention for obstacle-avoidance or a driver's intention to pass the preceding vehicle, in other words, the presence or absence of a driver's intention for lane-changing, so as to optimally control a shift to an automatic braking mode and to prevent an undesirable shift to the automatic baking mode.

In order to accomplish the aforementioned and other objects of the present invention, a braking control system with object detection system interaction comprises a relative-distance detector that detects a relative distance of a frontally positioned object relative to a host vehicle, a vehicle speed sensor that detects a host vehicle speed of the host vehicle, an automatic braking control unit configured to be electronically connected to at least the relative-distance detector and the vehicle speed sensor for automatically controlling, depending on both the relative distance and the host vehicle speed, a braking force needed for an automatic braking operation without driver's braking action when the host vehicle is approaching the frontally positioned object, the automatic braking control unit comprising a detection section that detects the presence or absence of a driver's intention for lane-changing, the automatic braking control unit limiting the automatic braking operation in the presence of the driver's intention for lane-changing.

According to another aspect of the invention, a braking control system with object detection system interaction comprises an object detection means for detecting a relative distance of a frontally positioned object relative to a host vehicle, a vehicle speed detection means for detecting a host vehicle speed of the host vehicle, an automatic braking control means configured to be electronically connected to at least the object detection means and the vehicle speed detection means for automatically controlling, depending on both the relative distance and the host vehicle speed, a braking force needed for an automatic braking operation without driver's braking action when the host vehicle is approaching the frontally positioned object, the automatic braking control means comprising means for detecting the presence or absence of a driver's intention for lane-changing, the automatic braking control means limiting the automatic braking operation in the presence of the driver's intention for lane-changing.

According to a further aspect of the invention, an automatic preliminary braking control system with object detection system interaction comprises a relative-distance detector that detects a relative distance of a frontally positioned object relative to a host vehicle, a vehicle speed sensor that detects a host vehicle speed of the host vehicle, a brake switch whose signal indicates if a brake pedal is depressed, an accelerator stroke sensor that detects an accelerator opening, an automatic braking control unit configured to be electronically connected to at least the relative-distance detector, the vehicle speed sensor, the brake switch and the accelerator stroke sensor for automatically controlling, depending on the relative distance, the host vehicle speed, the signal from the brake switch and the accelerator opening, a braking force needed for preliminary braking control initiated prior to driver's braking action when the host vehicle is approaching the frontally positioned object, the automatic braking control unit comprising a target deceleration rate calculation section that calculates a target deceleration rate, needed to avoid the host vehicle from being brought into collision-contact with the frontally positioned object, from an expression $Gx^* = \{Vm^2 - (Vm - dL/dt)^2\}/2L$, where $Gx^*$ is the target deceleration rate, $Vm$ is the host vehicle speed, $L$ is the relative distance, and $dL/dt$ is a time rate of change of the relative distance, a comparison section that determines whether the target deceleration rate is greater than or equal to a predetermined deceleration-rate threshold value, and a detection section that detects the presence or absence of a driver's intention for lane-changing, the automatic braking control unit inhibiting the preliminary braking control, when either of a condition that the brake pedal is undepressed, a condition that the accelerator opening is less than or equal to a predetermined threshold value substantially corresponding to a closed position of an accelerator, a condition that the target deceleration rate is greater than or equal to the predetermined deceleration-rate threshold value, and a condition that the driver's intention for lane-changing is absent, is unsatisfied.

According to a still further aspect of the invention, an automatic supplementary braking control system with object detection system interaction comprises a relative-distance detector that detects a relative distance of a frontally positioned object relative to a host vehicle, a vehicle speed sensor that detects a host vehicle speed of the host vehicle, a pressure sensor that detects an actual braking pressure, an automatic braking control unit configured to be electronically connected to at least the relative-distance detector, the vehicle speed sensor and the pressure sensor for automatically controlling, depending on the relative distance, the host vehicle speed and the actual braking pressure, a braking force needed for supplementary braking control through which a value of a controlled quantity is brought closer to a target deceleration rate needed for collision-avoidance when the host vehicle is approaching the frontally positioned object, the automatic braking control unit comprising a target deceleration rate calculation section that calculates the target deceleration rate, needed to avoid the host vehicle from being brought into collision-contact with the frontally positioned object, from an expression $Gx^* = \{Vm^2 - (Vm - dL/dt)^2\}/2L$, where $Gx^*$ is the target deceleration rate, Vm is the host vehicle speed, L is the relative distance, and dL/dt is a time rate of change of the relative distance, a computation section that computes a target braking pressure based on the target deceleration rate, a comparison section that determines whether the actual braking pressure is less than the target braking pressure, and a detection section that detects the presence or absence of a driver's intention for lane-changing, the automatic braking control unit decreasingly compensating for the target braking pressure for limiting the supplementary braking control, when a condition that the actual braking pressure is less than the target braking pressure and a condition that the driver's intention for lane-changing is present, are both satisfied.

According to another aspect of the invention, a method for automatically controlling a braking force needed for an automatic braking operation without driver's braking action when a host vehicle is approaching a frontally positioned object, the method comprises detecting a host vehicle speed, detecting a relative distance of the frontally positioned object relative to the host vehicle, detecting a signal from a brake switch, detecting an accelerator opening, detecting an actual braking pressure, calculating a time rate of change of the relative distance, calculating a target deceleration rate based on the host vehicle speed, the relative distance, and the rate of change of the relative distance, computing a target braking pressure based on the target deceleration rate, detecting the presence or absence of a driver's intention for. lane-changing, inhibiting preliminary braking control initiated prior to driver's braking action, when either of a condition that the brake pedal is undepressed, a condition that the accelerator opening is less than or equal to a predetermined threshold value substantially corresponding to a closed position of an accelerator, a condition that the target deceleration rate is greater than or equal to a predetermined deceleration-rate threshold value, and a condition that the driver's intention for lane-changing is absent, is unsatisfied, and decreasingly compensating for the target braking pressure for limiting supplementary braking control, when a condition that the actual braking pressure is less than the target braking pressure and a condition that the driver's intention for lane-changing is present, are both satisfied.

The other objects and features of this invention will become understood from the following description with reference to the accompanying drawings.

DESCRIPTION OF THE PREFERRED EMBODIMENTS

Figure 1:
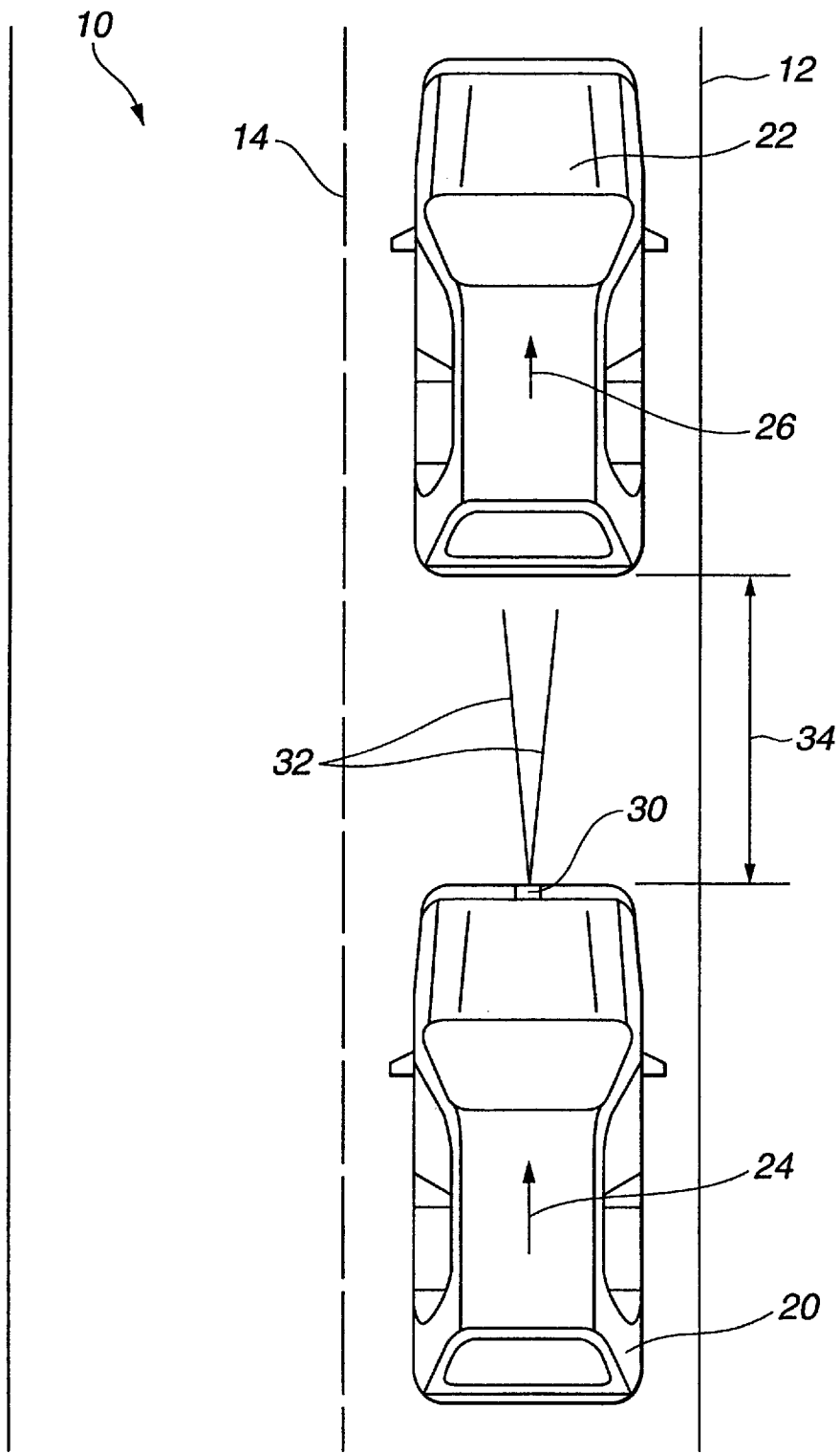
FIG. 1 is a system block diagram illustrating an automatic braking control system for first and second embodiments.

Referring now to the drawings, particularly to FIG. 1, the automatic braking control system of the embodiment is exemplified in a four-wheeled vehicle (a host vehicle) with front-left, front-right, rear-left, and rear-left, and rear-right road wheels 21FL, 21FR, 21RL, and 21RR. Front-left, front-right, rear-left, and rear-left, and rear-right wheel brake cylinders (brake actuators) 22FL, 22FR, 22RL, and 22RR are attached to the respective road wheels. Reference sign 25 denotes a brake master cylinder. In the shown embodiment, used is a dual master cylinder with two pistons, set in tandem. Each individual wheel brake cylinder (22FL, 22FR, 22RL, 22RR) is constructed to generate a wheel brake cylinder pressure (a braking force) substantially corresponding to a brake fluid pressure supplied from master cylinder 25 thereinto. A brake pedal 23 is connected or linked via an operating rod 6 to both an electronically-controlled vacuum brake booster 24 (which will be fully described later) and a master-cylinder pushrod 8 of master cylinder 25. A brake switch 26 is located near brake pedal 23 to signal an automatic braking control electronic control unit (ECU) 29 if the brake pedal is depressed. Front brake wheel cylinders 22FL and 22FR are communicated via a primary brake-fluid line 17a with the primary brake outlet port of master cylinder 25, while rear brake wheel cylinders 22RL and 22RR are communicated via a secondary brake-fluid line 17b with the secondary brake outlet port of master cylinder 25. In order to detect a total braking force applied to the vehicle, a first pressure sensor 32 is located on or screwed into the primary brake-fluid line 17a mainly to estimate a braking force (a negative longitudinal force) resulting from braking torque application on front road wheels 21FL and 21FR, whereas a second pressure sensor 33 is located on or screwed into the secondary brake-fluid line 17b mainly to estimate a braking force (a negative longitudinal force) resulting from braking torque application on rear road wheels 21RL and 21RR. That is, a brake-fluid pressure $P_{w1}$ sensed or detected by first pressure sensor 32 is used to estimate the braking force resulting from braking torque application on front road wheels 21FL and 21FR, while a brake-fluid pressure $P_{w2}$ sensed or detected by second pressure sensor 33 is used to estimate the braking force resulting from braking torque application on rear road wheels 21RL and 21RR. Usually, a value of brake fluid pressure $P_{w1}$ sensed by first pressure sensor 32 and a value of brake fluid pressure $P_{w2}$ sensed by second pressure sensor 33 are essentially identical to each other. Even when errors are contained in a detected pressure value of either one of first and second pressure sensors 32 and 33 due to a sensor failure, in order to enhance the control accuracy of the system, a dual pressure sensor system, composed of first and second pressure sensors 32 and 33, is used. An accelerator stroke sensor 28 is located near an accelerator pedal 27 whose stroke is used to estimate or detect an accelerator opening APS.

Figure 2:
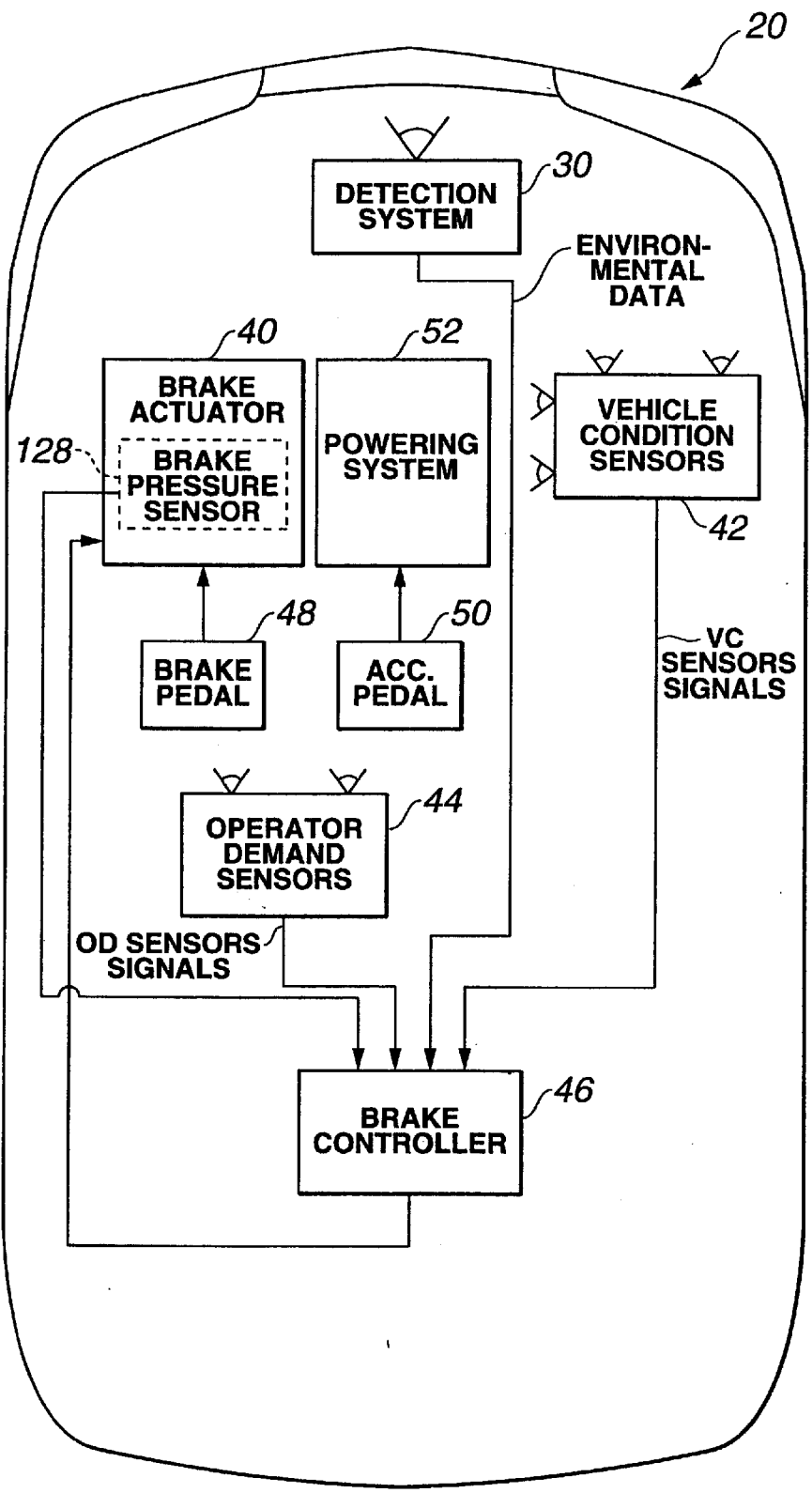
FIG. 2 is a longitudinal cross-sectional view illustrating a detailed construction of a vacuum brake booster used in the system of each of the first and second embodiments.

Referring now to FIG. 2, there is shown the detailed cross section of electronically-controlled vacuum brake booster 24. As clearly shown in FIG. 2, an internal space of a housing (not numbered) of brake booster 24 is divided into a variable pressure chamber 1 and a negative pressure chamber 2 via a diaphragm 14. With the brakes not applied, there is a negative pressure (e.g., intake-manifold vacuum produced during operation of the engine) on both sides of diaphragm 14, and thus the pressures applied on the two sides of diaphragm 14 are balanced. In contrast to the above, when brake pedal 23 is depressed for braking action and thus pushrod 8 is moved forward, this action causes a vacuum valve 3 to move toward its closed position and also causes an atmospheric valve 4 to move toward its open position. Thus, atmospheric pressure can enter the right-hand side space of diaphragm 14, that is, variable pressure chamber 1. Now, there is a differential pressure between the pressure in variable pressure chamber 1 and negative pressure chamber 2 and therefore the diaphragm is forced to move to the left (viewing FIG. 2). The leftward movement of diaphragm 14 causes pushrod 8 to further push the master-cylinder piston to the left. Hydraulic pressure develops in the master cylinder, thus forcing brake fluid through primary and secondary brake-fluid lines 17a and 17b to the wheel brake cylinders. In this manner, the braking action is assisted or increased. The pressure in negative pressure chamber 2 is maintained at a predetermined negative pressure during operation of the engine. A substantially cylindrical power piston member 17 is fixedly connected to the central portion of diaphragm 14. Power piston member 17 is formed with a communication passage 11 through which variable pressure chamber 1 and negative pressure chamber 2 are communicated with each other. The previously-noted vacuum valve 3 is provided at the rightmost opening end (a vacuum port 3a) of communication passage 11. When brake pedal 23 is depressed by the driver or when a brake-booster-control electromagnetic valve 5 is energized, vacuum valve 3 is closed so as to block fluid-communication between variable pressure chamber 1 and negative pressure chamber 2. With the previously-noted atmospheric valve 4 opened, atmospheric pressure is introduced into variable pressure chamber 1, and thus applied to the right-hand side of diaphragm 14. Actually, atmospheric valve 4 A cooperates with a valve body 12 formed integral with a substantially cylindrical slider 5b of electromagnetic valve 5, to open and close an atmospheric port 4a. When brake pedal 23 is depressed by the driver or when electromagnetic valve 5 is energized, atmospheric valve 4 is opened in such a manner that atmospheric pressure is introduced through atmospheric port 4a and a passage 7 into variable pressure chamber 1. Electromagnetic valve 5 is comprised of an electromagnetic solenoid 5a and slider 5b. Solenoid 5a is located in a boss-like solenoid casing 10 of power piston member 17 and coaxially arranged with respect to the axis of operating rod 6. Slider 5b is slidably accommodated in boss-like solenoid casing 10 and coaxially arranged with respect to the axis of operating rod 6. Slider 5b is formed at its rightmost end with a comparatively large-diameter stepped portion 18 which is in engagement with both vacuum valve 3 and atmospheric valve 4. In more detail, the leftward sliding of slider 5b is transmitted via the stepped portion 18 to both vacuum valve 3 and atmospheric valve 4, so as to close the vacuum valve and open the atmospheric valve. Slider 5b is permanently spring-loaded rightwards by means of a return spring 15 disposed in negative pressure chamber 2. As clearly shown in FIG. 2, operating rod 6 is located in the slider. Operating rod 6 is mechanically linked at its leftmost end via pushrod 8 to the master-cylinder piston of master cylinder 25. Operating rod 6 is also linked to brake pedal 23 via a brake-pedal pushrod 19. Reference sign 9 denotes a disk-shaped reaction member attached to the rightmost end of master-cylinder pushrod 8. On the other hand, a return spring 16 is disposed between operating rod 6 and slider 5b. A return spring 13a is disposed between stepped portion 18 of slider 5b and each of vacuum valve 3 and atmospheric valve 4, whereas a return spring 13b is disposed between power piston member 17 and brake-pedal pushrod 19.

Returning again to FIG. 1, as can be appreciated from a plurality of signal lines indicated by broken lines, ECU 29 receives input information from various vehicle sensors/switches. Automatic braking control ECU 29 generally comprises a microcomputer. ECU 29 includes an input/output interface (I/O), memories (RAM, ROM), and a microprocessor or a central processing unit (CPU). The input/output interface (I/O) of ECU 29 receives input informational data from various vehicle sensors and switches, namely a vehicle speed sensor 30, an object sensor or an object detector 31, an automatic braking control enable/disable switch 34, a steering angle sensor 35, a turn signal switch or a direction indicator switch or a winker switch 37, brake switch 26, accelerator stroke sensor 28, and first and second pressure sensors 32 and 33. Vehicle speed sensor 30 is provided to detect a host vehicle speed Vm. Usually, a transmission output speed of the host vehicle is used as the host vehicle speed. A scanning laser radar sensor is used as the object detector 31 to capture, recognize, sense or detect the preceding vehicle (or relevant target vehicle) or a frontally located object, and to monitor a vehicle-to-vehicle distance (or an inter-vehicle distance or a separating distance between the host vehicle and the preceding vehicle) or a relative distance L of the frontally located object (or the preceding vehicle) relative to the host vehicle, and to monitor a relative angle θ of the direction of the host vehicle's motion relative to the direction of the preceding vehicle's motion or relative to the object. That is, object detector 31 serves as a relative-angle detector as well as a relative-distance detector. As is generally known, the scanning laser radar sensor includes a scanning device, containing both a transmitter and a receiver. The scanning device of the laser radar sensor transmits a pulse of light (laser beam) in a horizontal line, back and forth. The scanning device measures the time of flight of the pulse of light, and then the relative distance or the inter-vehicle distance is calculated on the basis of the time interval from the transmitted pulse (the time when the laser beam is emitted from the host vehicle) to the received pulse (the time when the receiver receives the laser wave reflected from the preceding vehicle). Instead of the use of the scanning laser radar, a millimeter-wave radar sensor may be used for object detection. Alternatively, by image-processing image data of a stereocamera using a charge-coupled device (CCD) image sensor, the system is able to determine the host vehicle's distance from the preceding vehicle, that is, relative distance L between the host vehicle and the preceding vehicle, and relative angle θ. When automatic braking control enable/disable switch 34 is turned ON and thus a signal Sw from switch 34 is an ON voltage signal, the automatic brake pre-application control is in the enabled state. Conversely when automatic braking control enable/disable switch 34 is turned OFF and thus signal Sw from switch 34 is an OFF voltage signal, the automatic brake pre-application control is in the disabled state. Steering angle sensor 35 is provided to detect a steering angle δ of a steering wheel 36. When brake switch 26 is turned ON and thus a signal $S_{BRK}$ from brake switch 26 is an ON voltage signal, the brake pedal is depressed. Conversely when brake switch 26 is turned OFF and thus signal $S_{BRK}$ from brake switch 26 is an OFF voltage signal, the brake pedal is undepressed. When winker switch 37 is turned ON, a signal $T_N$ from winker switch 37 is an ON voltage signal. Conversely when winker switch 37 is turned OFF, signal $T_N$ from winker witch 37 is an OFF voltage signal. Within ECU 29, the central processing unit (CPU) allows the access by the I/O interface of input informational data signals ($S_{BRK}$, APS, $P_{w1}$, $P_{w2}$, Vm, L, θ, Sw, δ, $T_N$) from the previously-discussed vehicle switches and sensors. The CPU of ECU 29 incorporated in the system of the first embodiment is responsible for carrying the brake pre-application control program (see FIG. 3)/decision routine for a driver's intention for lane-changing (see FIG. 4) stored in memories and is capable of performing necessary arithmetic and logic operations containing an automatic braking control management processing (containing an automatic preliminary braking control achieved through brake-booster-control electromagnetic valve 5). Computational result (arithmetic calculation result), that is, a calculated output signal (solenoid drive current) is relayed via the output interface circuitry of the ECU to an output stage, namely the electromagnetic solenoid 5a constructing part of brake-booster-control electromagnetic valve 5 included in the automatic braking control system. As will be fully described hereunder in reference to the flow chart shown in FIG. 3, the system of the first embodiment operates to suppress or prevent automatic preliminary braking pressure application (automatic brake pre-application) in the presence of the driver's intention for lane-changing. In the shown embodiment, relative angle θ measured clockwise from the direction of the host vehicle's motion is positive, whereas relative angle θ measured counterclockwise from the direction of the host vehicle's motion is negative. Likewise, when steering wheel 36 is rotated clockwise, steering angle δ is positive. Conversely when steering wheel 36 is rotated counterclockwise, steering angle δ is negative.

Figure 3:
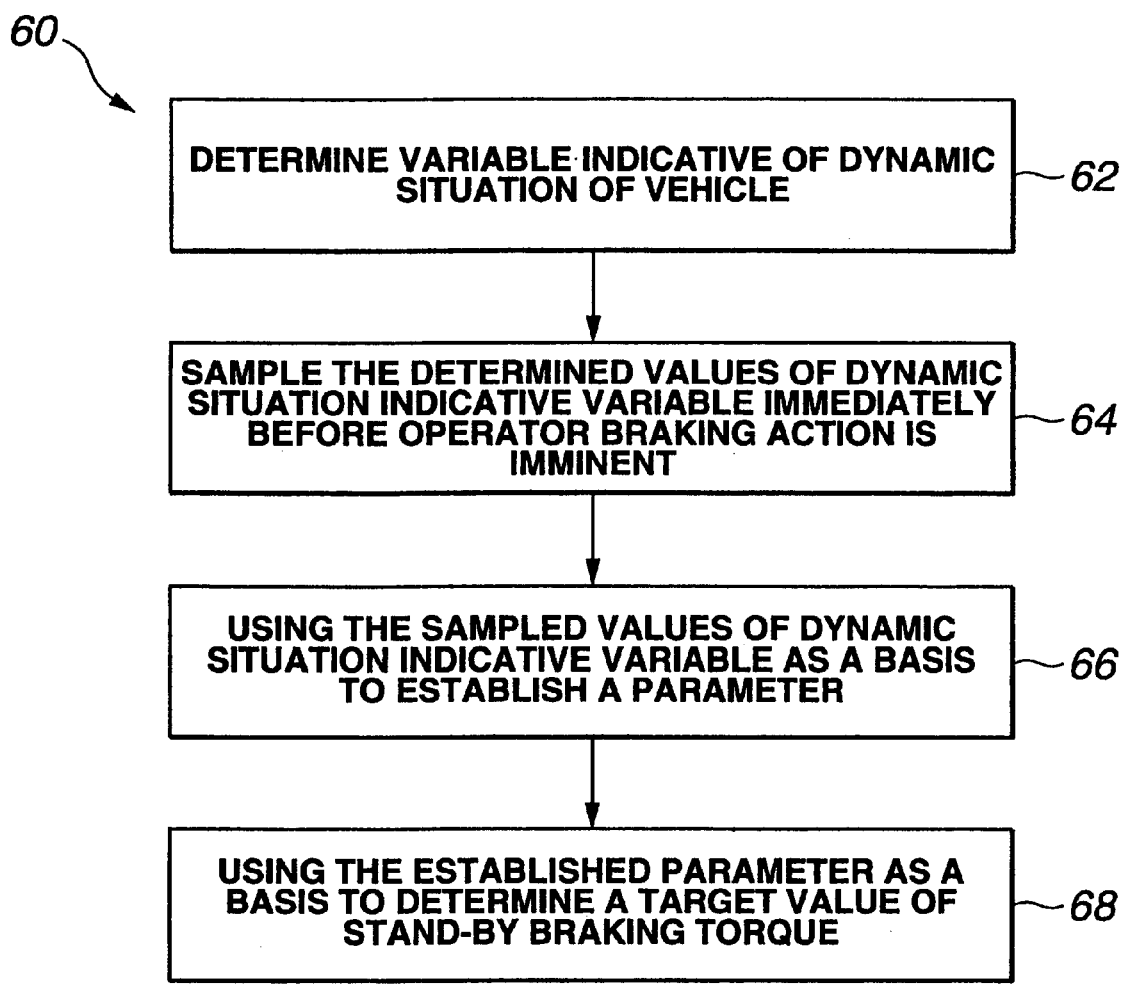
FIG. 3 is a flow chart illustrating a brake pre-application control routine (an automatic preliminary braking control routine) executed within a processor of an electronic control unit (ECU) incorporated in the system of the first embodiment.

The brake pre-application control (automatic preliminary braking pressure application control) is executed by the CPU of ECU 29 incorporated in the system of the first embodiment. The arithmetic processing shown in FIG. 3 is executed as time-triggered interrupt routines to be triggered every predetermined time intervals ΔT such as 10 msec.

Figure 4:
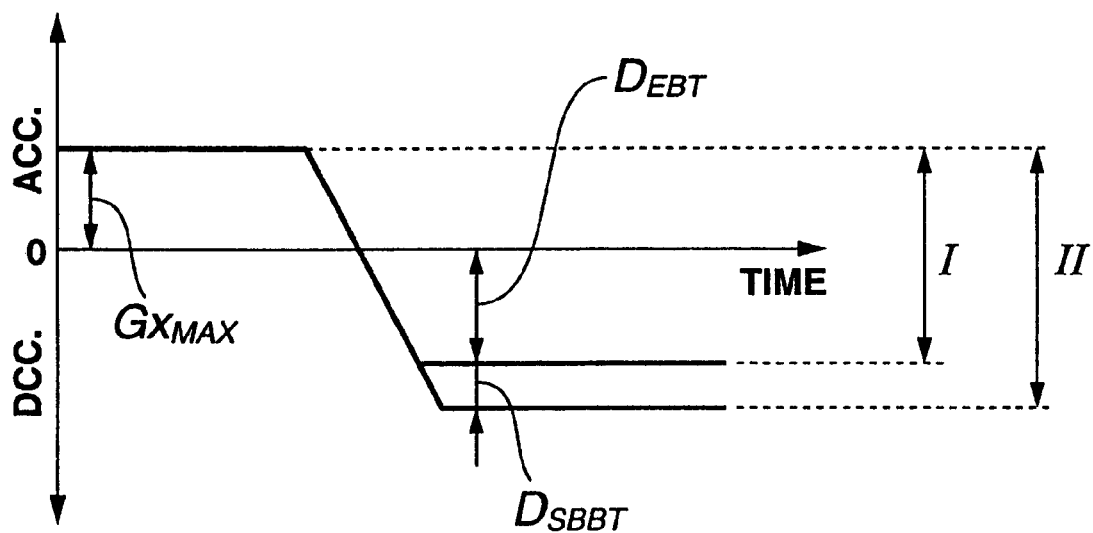
FIG. 4 is a flow chart illustrating a sub-routine used to determine a driver's intention for lane-changing and executed within a processor of the ECU incorporated in the system of each of the first and second embodiments.

At step S1, input informational data ($S_{BRK}$, APS, $P_{w1}$, $P_{w2}$, Vm, L, Sw) from the previously-noted vehicle sensors/switches and the decision result (LC=1 or LC=0) obtained by the decision routine of FIG. 4 for the driver's intention for lane-changing are read.

At step S2, the latest up-to-date host vehicle speed indicative data Vm is extracted.

At step S3, the latest up-to-date relative distance indicative data L is extracted.

At step S4, a derivative of relative distance L is calculated as a rate of change dL/dt of relative distance L with respect to t. The time rate of change dL/dt corresponds to a relative velocity of the host vehicle to the preceding vehicle (or the frontally located object).

At step S5, a target deceleration rate Gx*, needed to avoid the host vehicle from being brought into collision-contact with the preceding vehicle (or the frontally located object), is arithmetically calculated based on the host vehicle speed data Vm extracted through step S2, the relative distance data L extracted through step S3, and the time rate of change dL/dt calculated through step S4, from the following expression (1).

$$Gx^* = \{Vm^2 - (Vm - dL/dt)^2\}/2L \qquad (1)$$

At step S6, a check is made to determine whether the signal from brake switch 26 is the ON voltage signal (="1") or the OFF voltage signal (="0"). When the answer as to step S6 is in the affirmative (YES), that is, the brake pedal is depressed, the routine proceeds from step S6 to step S14. In contrast, when the answer to step S6 is in the negative (NO), that is, the brake pedal is undepressed, the routine proceeds from step S6 to step S7. At step S7, a check is made to determine whether the accelerator opening APS is greater than a predetermined threshold value $APS_{OFF}$ substantially corresponding to a closed position of the accelerator. When the answer to step S7 is affirmative, that is, in case of $APS>APS_{OFF}$, in other words, when the accelerator is depressed, the routine proceeds from step S7 to step S14. Conversely when the answer to step S7 is negative, that is, in case of $APS \leq APS_{OFF}$, for example, with the accelerator undepressed, the routine flows from step S7 to step S8.

At step S8, a test is made to determine whether a preliminary-braking-control state indicative flag (hereinafter is referred to as a "PB flag") $F_{PB}$ is set or reset. Setting (=1) of PB flag $F_{PB}$ means that the automatic braking control system is in the preliminary braking control mode, whereas resetting (=0) of PB flag FPB means that the automatic braking control system is out of the preliminary braking control mode. When the answer to step S8 is affirmative (YES), that is, in case of $F_{PB}=1$, the routine proceeds from step S8 to step S12. Conversely when the answer to step S8 is negative (NO), that is, in case of $F_{PB}=0$, the routine proceeds from step S8 to step S9.

At step S9, a check is made to determine if the absolute value $|GX^*|$ of target deceleration rate Gx* calculated at step S5 is greater than or equal to a predetermined deceleration-rate threshold value $Gx_0^*$. Actually, the calculated target deceleration rate Gx* is compared to a negative value $(-Gx_0^*)$ of predetermined deceleration-rate threshold value $Gx_0^*$, since the target deceleration rate Gx* is a negative value on the assumption that an acceleration rate is defined as a positive value and a deceleration rate is defined as a negative value. When the answer to step S9 is affirmative (YES), that is, in case of $|GX^*| \geq Gx_0^*$, in other words, when the calculated deceleration rate Gx* is less than or equal to a negative value $-Gx_0^*$ of predetermined deceleration-rate threshold value $Gx_0^*$, the routine proceeds from step S9 to step S10. In contrast, when the answer to step S9 is negative (NO), that is, in case of $|Gx^*|<Gx_0^*$, in other words, when the calculated deceleration rate Gx* is greater than the negative value $-Gx_0^*$ of predetermined deceleration-rate threshold value $Gx_0^*$, the routine flows from step S9 to step S14. The predetermined deceleration-rate threshold value $Gx_0^*$ is set to a value slightly lower than a deceleration rate created by driver's braking action during normal braking, under a precondition that a braking force based on the preliminary braking control mode, is produced automatically preliminarily prior to the driver's braking action, and thus the collision-contact between the host vehicle and the frontally located object (or the preceding vehicle) is finally avoided by way of the normal braking action by the driver.

At step S10, a check is made to determine whether a lane-changing indicative flag LC, which is based on the result of the decision routine of FIG. 4 (described later), is set or reset. Setting (=1) of lane-changing indicative flag LC means the presence of a driver's intention for lane-changing. Resetting (=0) of lane-changing indicative flag LC means that the absence of the driver's intention for lane-changing. When the ECU determines that the driver's intention for lane-changing is present, that is, in case of LC=1, the routine proceeds from step S10 to step S14. Conversely when the ECU determines that the driver's intention for lane-changing is absent, that is, in case of LC=0, the routine advances to a series of steps S11–S13, so as to initiate or engage the preliminary braking control. More accurately, at step S11, PB flag $F_{PB}$ is set to "1". At the same time, a preliminary-braking-control-mode target brake-fluid pressure $P_{PB}$ is set to a predetermined pressure value such as 0.1 MPa. On the basis of the preliminary-braking-control-mode target brake-fluid pressure $P_{PB}$ set, and the sensor signal values $P_{w1}$ and $P_{w2}$ from pressure sensors 32 and 33, the wheel-brake cylinder pressure of each of brake actuators 22FL, 322FR, 22RL and 22RR is feedback-controlled so that the actual wheel-brake cylinder pressure is brought closer to preliminary-braking-control-mode target brake-fluid pressure $P_{PB}$. In order to enable the driver to achieve braking action with an enhanced responsiveness by way of depression of the brake pedal subsequently to the preliminary braking control mode, the previously-noted predetermined pressure value is preprogrammed or preset. Such a set pressure value "0.1 MPa" is a comparatively small pressure value that there is little longitudinal deceleration (longitudinal G) exerted on the vehicle. Instead of setting preliminary-braking-control-mode target brake-fluid pressure $P_{PB}$ to a small pressure value such as 0.1 MPa, making great account of the enhanced braking effect, target braking-fluid pressure $P_{PB}$ may be set to a value greater than 0.1 MPa.

As can be appreciated from the equation CNT=CNT+1 shown in step S12, at step S12 a preliminary-braking-control counter CNT is incremented by "1".

At step S13, a check is made to determine whether the current counted value of preliminary-braking-control counter CNT is greater than or equal to a predetermined preliminary-braking count-up threshold value $CNT_0$. In case of $CNT \geq CNT_0$, the routine proceeds from step S13 to step S14. In contrast, in case of $CNT<CNT_0$, the routine returns from step S13 to step S1. Adequately considering the elapsed time (time-period) from the time when the ECU determines that the automatic preliminary braking pressure application (or brake pre-application control mode) is required as a preview to the time when the driver actually depresses the brake pedal and thus signal $S_{BRK}$ from brake switch 26 is switched from the OFF voltage signal to the ON voltage signal, preliminary-braking count-up threshold value $CNT_0$ is determined or preset. In the system of the first embodiment, preliminary-braking count-up threshold value $CNT_0$ is set at one second. Setting of preliminary-braking count-up threshold value $CNT_0$ at "one second" is based on the assumption that the driver probably depresses the brake pedal within one second from the time when the ECU determines that the preliminary braking pressure application is required, and that there is an error in determination of ECU 29 for the necessity of preliminary braking pressure application if the driver does not depress the brake pedal within one second from the initiation of the preliminary braking control-mode. As a matter of course, in order to enhance the control accuracy and response of the system, preliminary-braking count-up threshold value $CNT_0$ may be properly set at a time period other than 1 second, depending upon the type of the host vehicle.

Thereafter, at step S14, preliminary-braking-control state indicative flag (PB flag) $F_{PB}$ is reset to "0". Simultaneously, preliminary-braking-control-mode target brake-fluid pressure PPB is set to "0". In this manner, one cycle of the brake pre-application control routine of FIG. 3 terminates.

Referring now to FIG. 4, there is shown the decision routine for the presence or absence of a driver's intention for obstacle-avoidance or a driver's intention to pass the preceding vehicle, that is, the presence or absence of a driver's intention for lane-changing. The decision routine shown in FIG. 4 is also executed as time-triggered interrupt routines to be triggered every predetermined time intervals $\Delta T$ such as 10 msec.

At step S51, input informational data ($\delta$, Vm, L, $\theta$) from the previously-noted vehicle sensors are read.

At step S52, the latest up-to-date steering angle indicative data $\delta$ and the latest up-to-date host vehicle speed indicative data Vm are extracted.

At step S53, the latest up-to-date relative distance indicative data L and the latest up-to-date relative angle indicative data $\theta$ are extracted.

At step S54, a derivative of relative distance L is calculated as a rate of change dL/dt of relative distance L with respect to t.

At step S55, a rate $\{L/(dL/dt)\}$ of relative distance L with respect to the time rate of change dL/dt, that is, a time-to-collision-contact (simply, a time-to-collision TC) representative of an elapsed time before the host vehicle is brought into collision-contact with the preceding vehicle or the frontally located object, is arithmetically calculated from the following expression (2).

$$TC = L/(dL/dt) \qquad (2)$$

Figure 5:
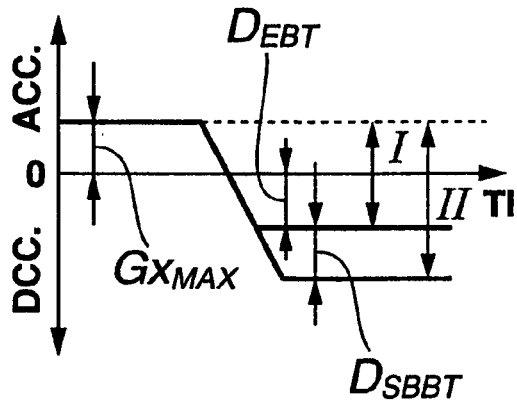
FIG. 5 is an explanatory view showing that a sign of a relative angle $\theta_1$ ($\theta_2$) is an inverse (or a negative) of a sign of a steering angle δ when a host vehicle is steered to a right (or to a left) under a condition wherein the host vehicle is driving straight ahead.

At step S56, on the basis of the product ($\delta \times \theta$) of steering angle $\delta$ and relative angle $\theta$, the ECU determines if the driver's lane-changing operation is initiated, and simultaneously the ECU determines if the vehicle is driving straight ahead or cornering a curve. Concretely, when the product ($\delta \times \theta$) of steering angle $\delta$ and relative angle $\theta$ is less than a negative value $-\gamma$ of a predetermined positive value $\gamma$, that is, in case of $\delta \times \theta < -\gamma$, the ECU determines that the lane-changing operation is initiated during straight-ahead driving. Thus, in the presence of the initiation of lane-changing operation during straight-ahead driving, the routine proceeds from step S56 to step S57. This is because, as can be seen from the explanatory view of FIG. 5, when the host vehicle HV passes the preceding vehicle PV from the right-hand side of the latter under a condition wherein a direction D along the host vehicle's lane or road or corridor is straight, host vehicle HV is steered to the right and thus steering angle $\delta$ becomes positive, whereas relative angle $\theta_1$ becomes negative, and as a result the product ($\delta \times \theta$) of steering angle $\delta$ and relative angle $\theta$ becomes negative. Conversely, when the host vehicle HV passes the preceding vehicle PV from the left-hand side of the latter under a condition wherein direction D along the host vehicle's lane or road or corridor is straight, host vehicle HV is steered to the left and thus steering angle $\delta$ becomes negative, whereas relative angle $\theta_2$ becomes positive, and as a result the product ($\delta \times \theta$) of steering angle $\delta$ and relative angle $\theta$ becomes negative.

Figure 6:
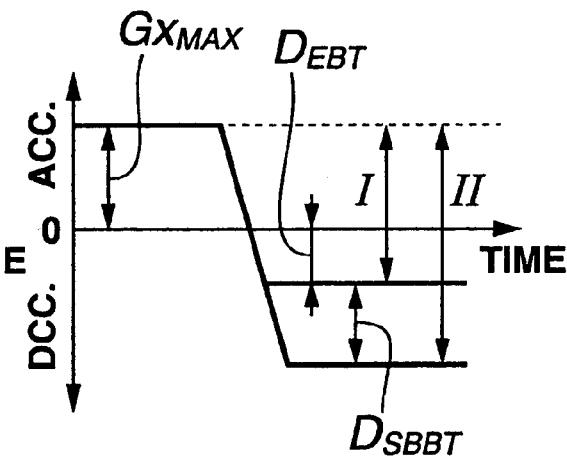
FIGS. 6A and 6B are explanatory views showing that a sign of relative angle $\theta_1$ ($\theta_2$) is a positive of a sign of steering angle δ when the host vehicle is steered to the right (or to the left) during a right-hand turn (or during a left-hand turn).

In contrast, in case of $\delta \times \theta > \gamma$, the ECU determines that the lane-changing operation is initiated during cornering. Thus, in the presence of the initiation of lane-changing operation during cornering, the routine proceeds from step S56 to step S61. This is because, as can be seen from the explanatory view of FIG. 6A, when host vehicle HV passes preceding vehicle PV from the right-hand side of the latter under a condition wherein direction D along the host vehicle's lane or road or trajectory corridor is curved rightwards, host vehicle HV is steered to the right and thus steering angle $\delta$ becomes positive, whereas relative angle $\theta_1$ becomes positive, and as a result the product ($\delta \times \theta$) of steering angle $\delta$ and relative angle $\theta$ becomes positive during a right turn on a rightwardly-curved trajectory corridor. As can be seen from the explanatory view of FIG. 6B, conversely when host vehicle HV passes preceding vehicle PV from the left-hand side of the latter under a condition wherein direction D along the host vehicle's lane or road or corridor is curved leftwards, host vehicle HV is steered to the left and thus steering angle $\delta$ becomes negative, whereas relative angle $\theta_2$ becomes negative, and as a result the product ($\delta \times \theta$) of steering angle $\delta$ and relative angle $\theta$ becomes positive during a left turn on a leftwardly-curved trajectory corridor.

In contrast to the above, in case of $-\gamma \leq \delta \times \theta \leq \gamma$, in other words, in the absence of the initiation of lane-changing operation during cornering and in the absence of the initiation of lane-changing operation during straight-ahead driving, the ECU determines that the lane-changing operation is not initiated. Therefore, the routine flows from step S56 to step S66.

In the presence of the initiation of lane-changing operation during straight-ahead driving, the routine advances to a series of steps S57–S60 needed to precisely determine the presence or absence of the driver's intention for lane-changing during straight-ahead driving on the basis of both the magnitude of steering angle $\delta$ and the magnitude of relative angle $\theta$.

Figure 7:
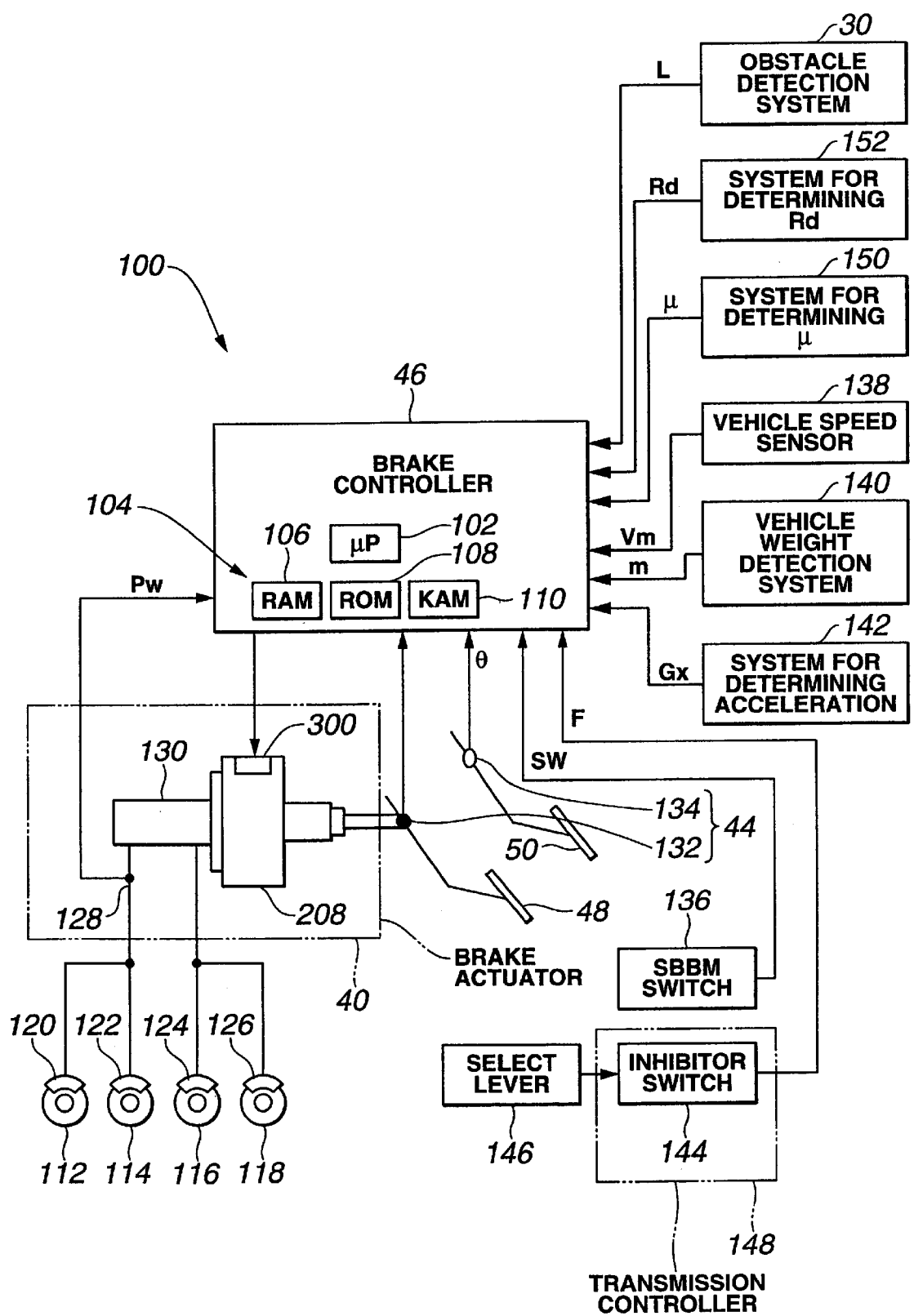
FIG. 7 is a preprogrammed steering angle threshold value α versus time-to-collision TC (representing an elapsed time before the host vehicle is brought into collision-contact with the preceding vehicle) characteristic map.
Figure 8:
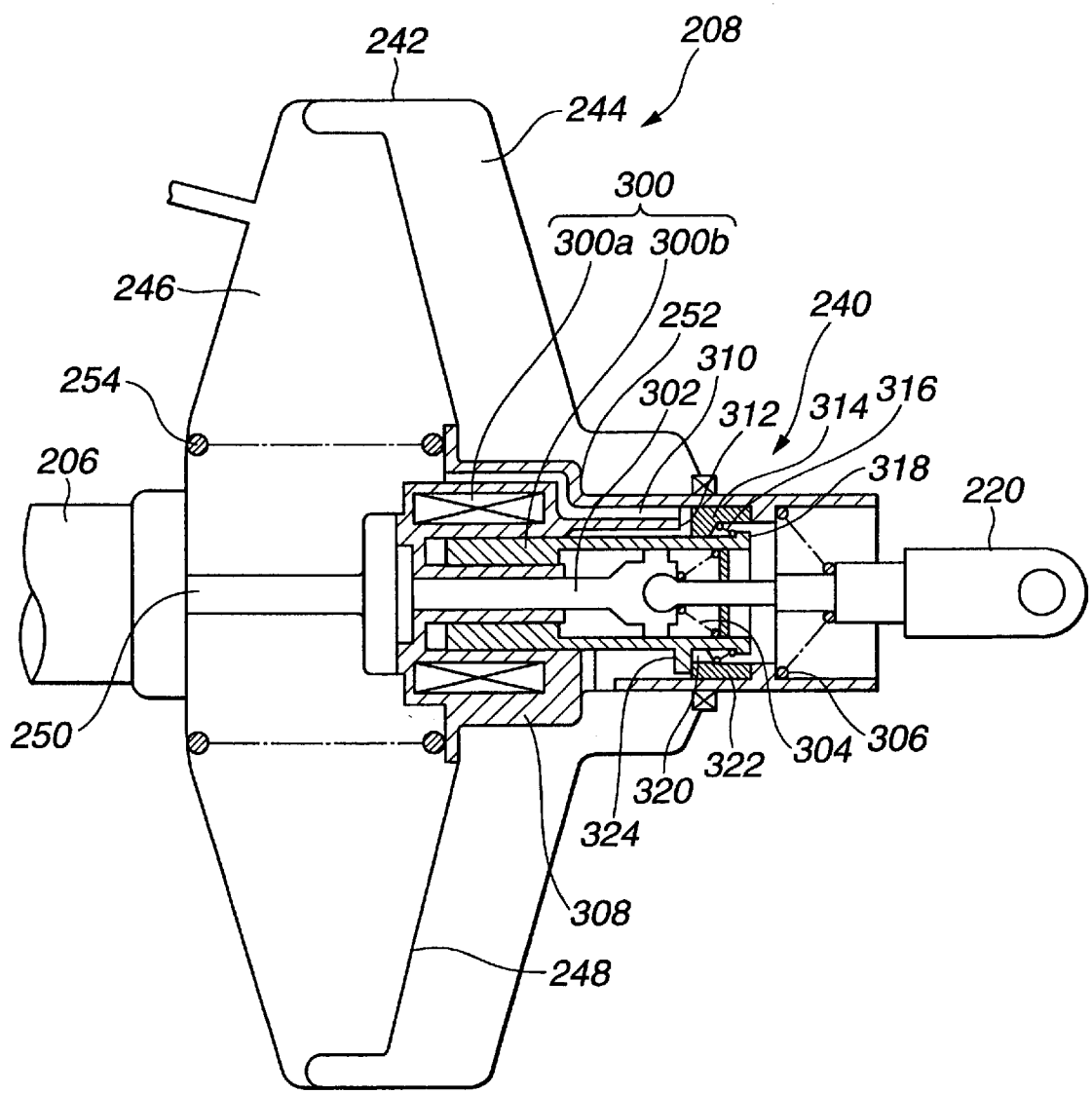
FIG. 8A is a timing chart showing the relationship between variations in steering angle δ and variations in relative angle θ in case of a comparatively short time-to-collision TC(L).
FIG. 8B is a timing chart showing the relationship between variations in steering angle δ and variations in relative angle θ in case of a comparatively long time-to-collision TC(L).

At step S57, a steering angle threshold value $\alpha$ for an absolute value of steering angle $\delta$, used to determine the presence or absence of the driver's intention for lane-changing during straight-ahead driving, is retrieved from a preprogrammed characteristic map map0 of FIG. 7 showing how a steering angle threshold value $\alpha$ has to be varied relative to a time-to-collision TC. As clearly seen from preprogrammed characteristic map map0 of FIG. 7, within a relatively shorter time-to-collision area TC_S that time-to-collision TC is shorter than or equal to a predetermined time TC1, steering angle threshold value $\alpha$ is set to a predetermined maximum value $\alpha_{max}$. Within a relatively longer time-to-collision area TC_L that time-to-collision TC is longer than or equal to a predetermined time TC2 (greater than predetermined time TC1), steering angle threshold value $\alpha$ is set to a predetermined minimum value $\alpha_{min}$. Within an intermediate area TC_M defined between the two areas TC_S and TC_L, steering angle threshold value $\alpha$ decreases in a linear fashion as time-to-collision TC increases. This is because, as can be appreciated from the timing charts shown in FIGS. 8A and 8B, in other words, as can be appreciated from the relationship between the magnitude $|\delta 1|$ of a steering angle $\delta 1$ obtained in case of the shorter time-to-collision TC(L) and the magnitude $|\delta 2|$ of a steering angle $\delta 2$ obtained in case of the longer time-to-collision TC(L), that is, the inequality $|\delta 1| > |\delta 2|$, steering angle $\delta$ tends to reduce as time-to-collision TC increases or lengthens.

Figure 9:
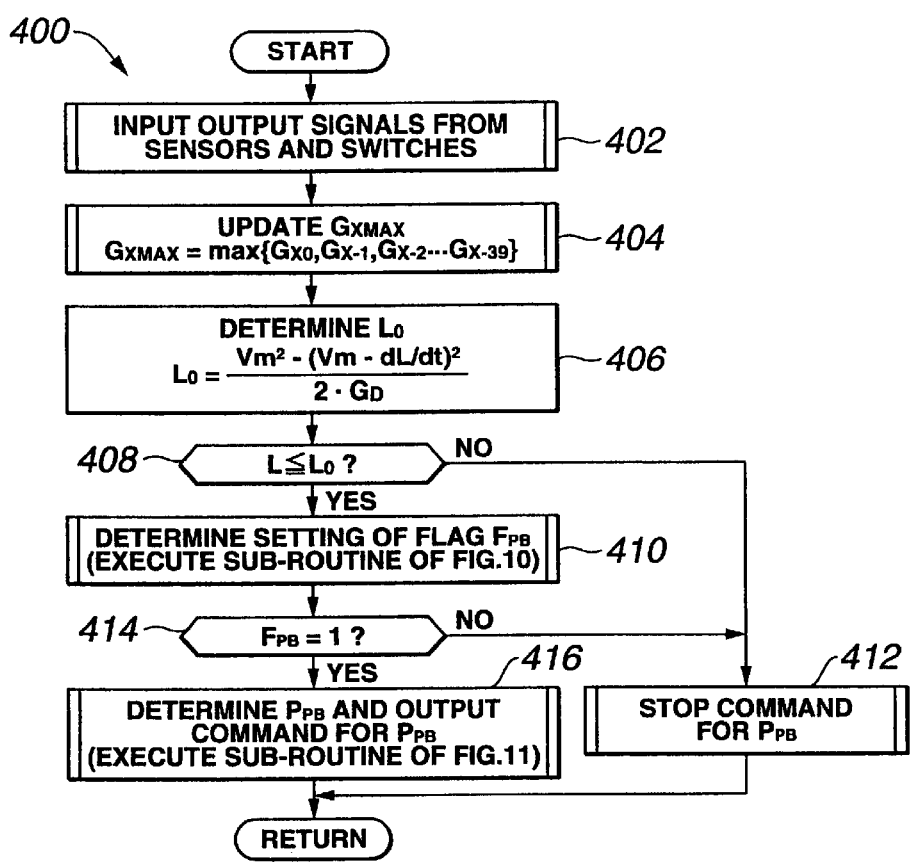
FIG. 9 is a preprogrammed relative angle threshold value β versus relative distance L characteristic map.

At step S58, a relative angle threshold value $\beta$ for an absolute value of relative angle $\theta$, used to determine the presence or absence of the driver's intention for lane-changing during straight-ahead driving, is retrieved from a preprogrammed characteristic map map2 of FIG. 9 showing how a relative angle threshold value $\beta$ has to be varied relative to a relative distance L. As clearly seen from preprogrammed characteristic map map2 of FIG. 9, within a relatively shorter relative-distance area L_S that relative distance L is shorter than or equal to a predetermined distance L1, relative angle threshold value $\beta$ is set to a predetermined maximum value $\beta_{max}$. Within a relatively longer relative-distance area L_L that relative distance L is longer than or equal to a predetermined distance L2 (greater than predetermined distance L1), relative angle threshold value $\beta$ is set to a predetermined minimum value $\beta_{min}$.

Figure 10:
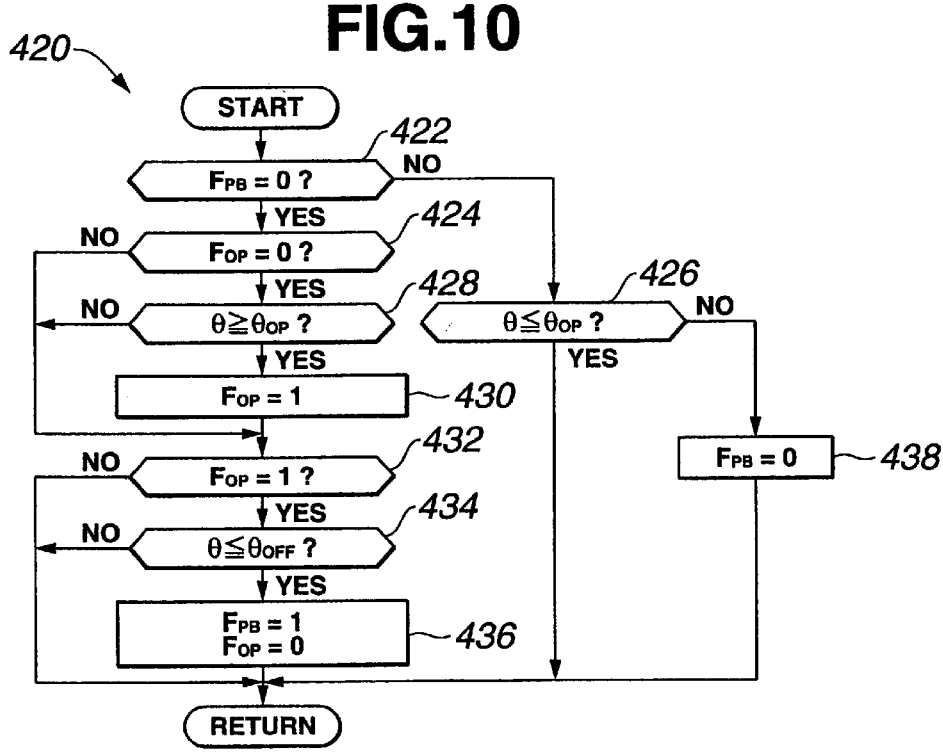
FIG. 10 is a relative angle θ versus relative distance L characteristic curve.

Within an intermediate area L__M defined between the two areas L__S and L__L, relative angle threshold value β decreases in a linear fashion as relative distance L increases. This is because, as can be appreciated from the timing charts shown in FIGS. 8A and 8B, in other words, as can be appreciated from the relationship between the magnitude |θ1| of a relative angle θ1 obtained in case of the shorter time-to-collision TC(L) and the magnitude |θ2| of a relative angle θ2 obtained in case of the longer time-to-collision TC(L), i.e., the inequality |θ1|>|θ2|, and as can be appreciated from the relative angle θ versus relative distance L characteristic curve shown in FIG. 10, relative angle θ tends to reduce as relative distance L (time-to-collision TC) increases or lengthens.

At step S59, a check is made to determine whether the absolute value |δ| of steering angle δ is greater than steering angle threshold value α. When the answer to step S59 is affirmative, step S60 occurs. Conversely when the answer to step S59 is negative, the routine proceeds from step S59 to step S66.

At step S60, a check is made to determine whether the absolute value |θ| of relative angle θ is greater than relative angle threshold value β. When the answer to step S60 is affirmative, the routine flows to step S65. Conversely when the answer to step S60 is negative, the routine proceeds from step S60 to step S66.

At step S65, lane-changing indicative flag LC is set to "1". In contrast, at step S66, lane-changing indicative flag LC is reset to "0".

As appreciated from the flow from step S56 through steps S57–S60 to step S65, when the two conditions, namely |δ|>α and |θ|>β, are satisfied in the presence of the initiation of lane-changing operation during straight-ahead driving, the ECU determines that the driver's intention for lane-changing is present during straight-ahead driving.

On the other hand, in the presence of the initiation of lane-changing operation during cornering, the routine advances to a series of steps S61–S64 needed to precisely determine the presence or absence of the driver's intention for lane-changing during cornering on the basis of a deviation Δρ between first and second curvatures $\rho_1$ and $\rho_2$. First curvature $\rho_1$ means a curvature of the host vehicle's course or the host vehicle's curved lane. Second curvature $\rho_2$ means a curvature of an intended course for the host vehicle when the host vehicle is turning toward the object (the preceding vehicle).

At step S61, first curvature $\rho_1$ is arithmetically calculated or estimated based on steering angle δ and host vehicle speed Vm both extracted through step S52, from the following expression (3).

$$\rho_1 = (1 + A \times Vm^2) \times l_{WB} \times N/\delta \quad (3)$$

where A denotes a vehicle stability factor for the host vehicle, $l_{WB}$ denotes a wheel base of the host vehicle, and N denotes a steering gear ratio of the host vehicle.

Figure 12:
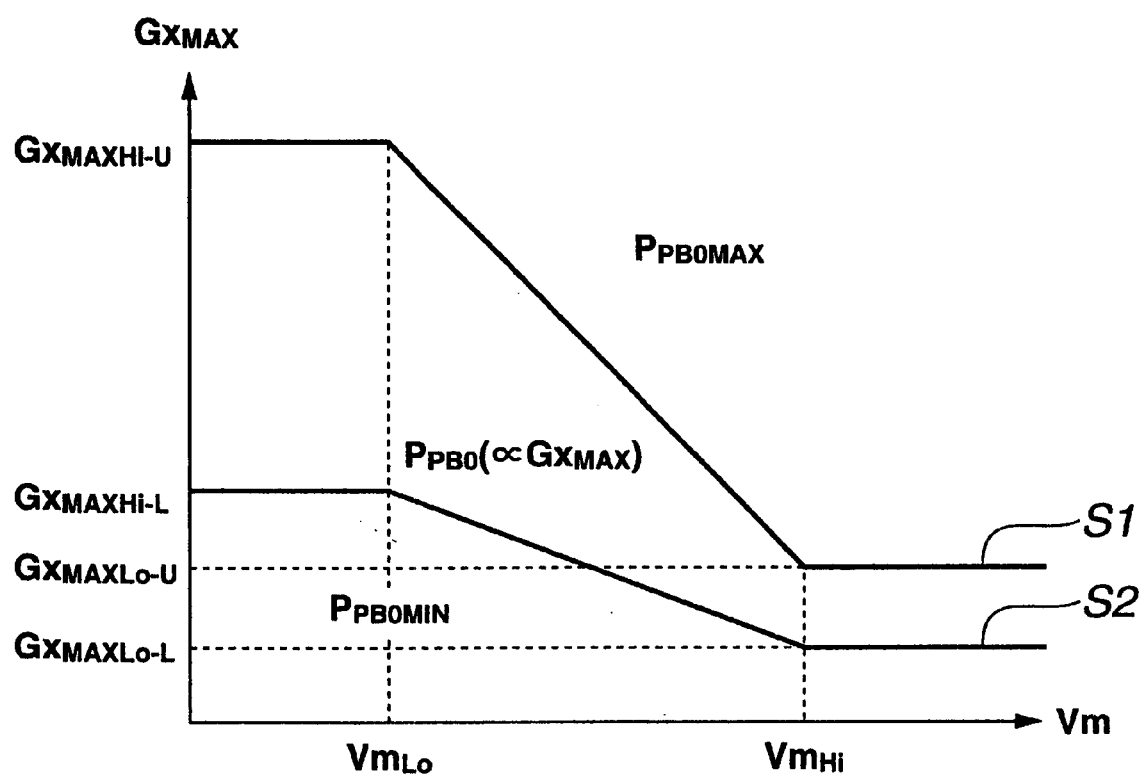
FIG. 12 is a conceptual diagram used to estimate the relationship between deviation Δρ and time-to-collision TC.

At step S62, second curvature $\rho_2$ is arithmetically calculated or estimated based on relative distance L and relative angle θ both extracted through step S53, from the following expression (4) (see FIG. 12).

$$\rho_2 = L/(2 \times \sin\theta) \quad (4)$$

Figure 11:
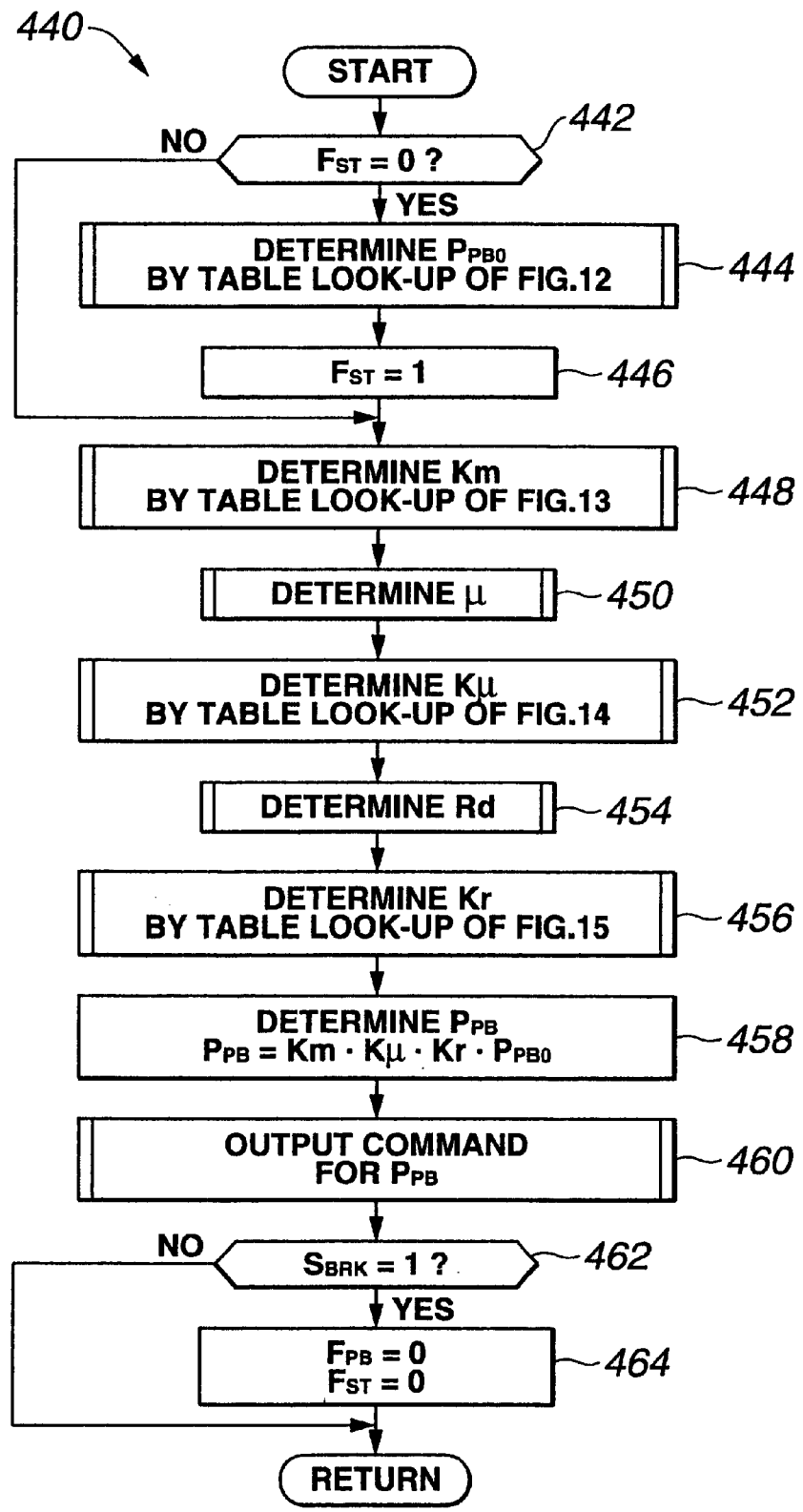
FIG. 11 is a preprogrammed deviation threshold value α1 (a threshold value for a deviation Δρ between first and second curvatures $\rho_1$ and $\rho_2$) versus time-to-collision TC characteristic map.

At step S63, a deviation threshold value α1 for deviation Δρ between first and second curvatures $\rho_1$ and $\rho_2$, used to determine the presence or absence of the driver's intention for lane-changing during cornering, is retrieved from a preprogrammed characteristic map map1 of FIG. 11 showing how a deviation threshold value α1 has to be varied relative to a time-to-collision TC. As clearly seen from preprogrammed characteristic map map1 of FIG. 11, within a relatively shorter time-to-collision area TC__S that time-to-collision TC is shorter than or equal to a predetermined time TC3, deviation threshold value α1 is set to a predetermined maximum value $\alpha 1_{max}$. Within a relatively longer time-to-collision area TC__L that time-to-collision TC is longer than or equal to a predetermined time TC4 (greater than predetermined time TC3), deviation threshold value α1 is set to a predetermined minimum value $\alpha 1_{min}$. Within an intermediate area TC__M defined between the two areas TC__S and TC__L, deviation threshold value α1 decreases in a linear fashion as time-to-collision TC increases. This is because, as can be appreciated from the conceptual diagram shown in FIG. 12, the deviation Δρ varies depending on the degree of the host vehicle's approach to the object (or the preceding vehicle). That is, the shorter the-time-to-collision TC corresponding to an elapsed time before the host vehicle HV is brought into collision-contact with the preceding vehicle PV, the greater the deviation Δρ between first and second curvatures $\rho_1$ and $\rho_2$ can become. In FIG. 12, W denotes a width of the host vehicle's lane or path, whereas V denotes a velocity of the host vehicle.

At step S64, a check is made to determine whether the absolute value |Δρ| of deviation Δρ is greater than deviation threshold value α1. When the answer to step S64 is affirmative, that is, in case of |Δρ|>α1, the routine proceeds from step S64 to step S65, so as to set the lane-changing indicative flag LC. In contrast, in case of |Δρ|≦α1, the routine flows from step S64 to step S66, so as to reset the lane-changing indicative flag LC.

As appreciated from the flow from step S56 through steps S61–S64 to step S65, when the necessary condition, that is, |Δρ|>α1 is satisfied in the presence of the initiation of lane-changing operation during cornering, the ECU determines that the driver's intention for lane-changing is present during cornering.

The automatic braking control system of the first embodiment operates as follows.

As soon as target deceleration rate Gx*, needed to avoid the host vehicle from being brought into collision-contact with the preceding vehicle (or the frontally located object), exceeds predetermined deceleration-rate threshold value $Gx_0^*$ when the host vehicle is approaching the preceding vehicle, preliminary-braking-control-mode target brake-fluid pressure $P_{PB}$ is set to the predetermined pressure value, such as 0.1 MPa (see step S11), continuously for a predetermined period of time, such as 1 sec (see step S13), under a particular condition wherein the brake pedal is undepressed (see the flow from step S6 to step S7) and the accelerator pedal is undepressed (see the flow from step S7 to step S8) and lane-changing indicative flag LC is reset (=0), and thus the preliminary braking control mode is executed for the predetermined time period by driving vacuum brake booster 24 (see the flow from step S6 through steps S7–S12 to step S13 in FIG. 3). Concretely, during the preliminary braking control mode, electromagnetic solenoid 5a is energized, vacuum valve 3 is closed and at the same time atmospheric valve 4 is opened, thereby permitting atmospheric pressure to enter variable pressure chamber 1. Thus, there is a differential pressure between the pressure in variable pressure chamber 1 and negative pressure chamber 2, and whereby hydraulic pressure develops in the master cylinder and thus brake fluid is forced through the brake-fluid lines to the wheel-brake cylinders. When the brake pedal is depressed by the driver during the preliminary braking control mode, a desired braking-force can be produced rapidly responsively to the driver's braking action, since the hydraulic pressure corresponding to preliminary-braking-control-mode target brake-fluid pressure $P_{PB}$ has developed in the master cylinder owing to the preliminary braking control.

In contrast to the above, when the result of the decision routine of FIG. 4 indicates the presence of the driver's intention for lane-changing, that is, in case of LC=1, the ECU operates to disengage or cancel the preliminary braking control function (see the flow from step S1 to step S14). Therefore, when the lane-changing operation is made by the driver in order to avoid the host vehicle from being brought into collision-contact with the frontally located object, or to pass the preceding vehicle, that is, in the absence of a driver's intention for braking, the system of the first embodiment can inhibit the preliminary braking control function. In addition to the above, according to the system of the first embodiment, it is possible to precisely determine the presence or absence of the driver's intention for lane-changing during cornering (see the flow from step S56 through steps S61–S64 to steps S65 or S66) as well as during straight-ahead driving. Even when the host vehicle is approaching the preceding vehicle due to driver's inattentive driving, it is possible to engage or initiate the preliminary braking control function (see the flow from step S56 through steps S61–S64 to step S66), since there is an increased tendency for the deviation $\Delta\rho$ between first and second curvatures $\rho_1$ and $\rho_2$, to be less than deviation threshold value $\alpha 1$ during the driver's inattentive driving.

Figure 13:
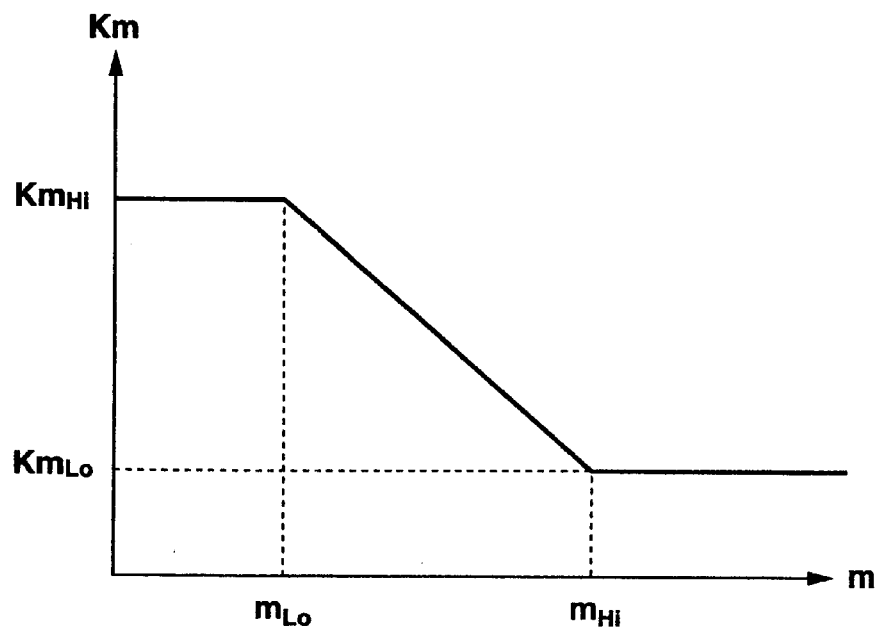
FIG. 13 is a preprogrammed deviation threshold value α2 (a threshold value for deviation Δρ versus relative-angle time TA characteristic map.

In the system of the first embodiment, deviation threshold value $\alpha 1$ for deviation $\Delta\rho$ between first and second curvatures $\rho_1$ and $\rho_2$, used to determine the presence or absence of the driver's intention for lane-changing during cornering, is retrieved from preprogrammed characteristic map map1 of FIG. 11 showing the relationship between deviation threshold value $\alpha 1$ and time-to-collision TC. Instead of using the characteristic map map1 of FIG. 11, a preprogrammed characteristic map of FIG. 13 showing the relationship between a relative-angle time TA and deviation threshold value $\alpha 2$ may be used. Relative-angle time TA is defined by the following expression (5).

$$TA=\theta/(dL/dt) \quad (5)$$

That is, the relative-angle time is defined as a rate $\{\theta/(dL/dt)\}$ of relative angle $\theta$ with respect to time rate of change $dL/dt$ of relative distance L. As clearly seen from preprogrammed characteristic map of FIG. 13, within a relatively shorter relative-angle time area TA_S that relative-angle time TA is shorter than or equal to a predetermined time TA1, deviation threshold value $\alpha 2$ is set to a predetermined maximum value $\alpha 2_{max}$. Within a relatively longer relative-angle time area TA_L that relative-angle time TA is longer than or equal to a predetermined time TA2 (greater than predetermined time TA1), deviation threshold value $\alpha 2$ is set to a predetermined minimum value $\alpha 2_{min}$. Within an intermediate area TA_M defined between the two areas TA_S and TA_L, deviation threshold value $\alpha 2$ decreases in a linear fashion as relative-angle time TA increases. In lieu of the use of the expression (5), relative-angle time TA may be calculated as a derivative of relative angle $\theta$, that is, a time rate of change $d\theta/dt$ of relative angle $\theta$. In the system of the first embodiment, although the presence or absence of the driver's intention for lane-changing is determined by way of the decision routine of FIG. 4, in lieu thereof, a signal value of signal $T_N$ from winker switch 37 may used. In this case, the ECU determines that the driver's intention for lane-changing is present only when the ON voltage signal from winker switch 37 is input into the input interface of ECU 29.

Figure 14:
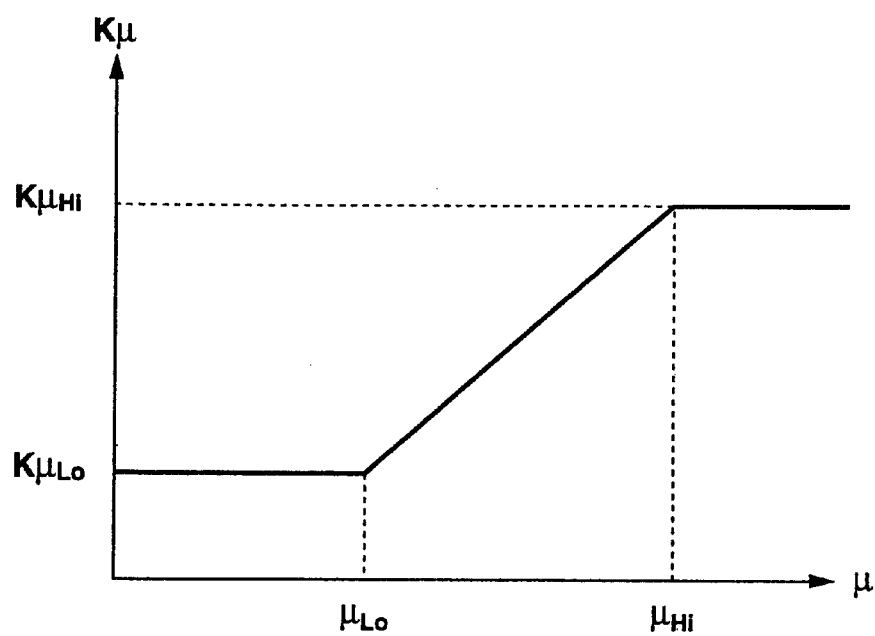
FIG. 14 is a flow chart illustrating an automatic supplementary brake-application control routine executed within a processor of the ECU incorporated in the system of the second embodiment.

Referring now to FIG. 14, there is shown the automatic supplementary brake-application control routine executed within the processor of ECU 29 incorporated in the system of the second embodiment. In the same manner as the first embodiment, the system of the second embodiment uses the decision routine shown in FIG. 4 for the purpose of precisely determining the presence or absence of the driver's intention for lane-changing during cornering as well as during straight-ahead driving. Note that the system of the first embodiment is based on a precondition that a braking force based on the preliminary braking control mode is produced for a predetermined time period, for example one second, automatically preliminarily prior to the driver's braking action. In the system of the first embodiment, the preliminary braking control function is inhibited or disengaged or limited in the presence of the driver's intention for lane-changing (LC=1), and is engaged or initiated in the absence of the driver's intention for lane-changing (LC=0). On the other hand, the system of the second embodiment is based on a precondition that a braking force based on the supplementary brake-application control mode (or the supplementary braking control mode) is applied as necessary, for the purpose of avoidance of collision-contact of the host vehicle with the frontally located object or the preceding vehicle, automatically supplementally irrespective of the presence or absence of the driver's braking action. In the system of the second embodiment, the supplementary braking control mode is executed with a limitation in the presence of the driver's intention for lane-changing (LC=1), and is executed with no limitation in the absence of the driver's intention for lane-changing (LC=0). In other words, as hereunder described in detail, in case of LC=0, a target braking pressure Pt based on target deceleration rate Gx* is used for the supplementary braking control. In case of LC=1, a compensated target braking pressure Pt*, which is obtained by decreasingly compensating for target braking pressure Pt, is used to properly suppress the supplementary braking control. Briefly speaking, in the system of the second embodiment, target deceleration rate Gx*, needed to avoid the host vehicle from being brought into collision-contact with the preceding vehicle or the frontally located object, is arithmetically calculated based on three factors, namely host vehicle speed Vm, relative distance L, and time rate of change dL/dt. On the basis of the comparison result between target braking pressure Pt based on target deceleration rate Gx* and an actual braking pressure Pr estimated or computed from brake-fluid pressures $P_{w1}$ and $P_{w2}$ detected, supplementary brake application is performed as necessary, when there is a lack of the deceleration rate created by the driver's braking action or when there is no driver's braking action.

The supplementary brake-application control routine shown in FIG. 14 is executed as time-triggered interrupt routines to be triggered every predetermined time intervals $\Delta T$ such as 10 msec.

First of all, at step S101, input informational data ($P_{w1}$, $P_{w2}$, Vm, L, $\theta$) from the previously-noted vehicle sensors and the decision result (TC, LC=1 or LC=0) obtained by the decision routine of FIG. 4 for the driver's intention for lane-changing are read.

At step S102, the latest up-to-date host vehicle speed indicative data Vm is extracted.

At step S103, the latest up-to-date relative distance indicative data L is extracted.

At step S104, a derivative of relative distance L is calculated as a rate of change dL/dt of relative distance L with respect to t. The time rate of change dL/dt corresponds to a relative velocity of the host vehicle to the preceding vehicle (or the frontally located object).

At step S105, a velocity Vf of the frontally located object or a velocity Vf of the preceding vehicle, positioned in the host vehicle's forward path, is arithmetically calculated based on both the host vehicle speed Vm and the rate of change dL/dt of relative distance L, from the following expression.

$$Vf=Vm-dL/dt$$

Then, in the same step S105, a check is made to determine whether the velocity Vf of the frontally located object or the preceding vehicle is "0". Vf=0 means that the frontally located object is in a stationary state or the preceding vehicle is at a standstill. When the answer to step S105 is negative (NO), the routine proceeds from step S105 to step S109. At step S109, a check is made to determine whether a variation $(Vf-Vf_{old})$ of the current velocity Vf calculated at step S105 at the current control cycle from the previous velocity $Vf_{old}$ calculated one cycle before, that is, a rate of change of velocity Vf of the frontally-positioned moving object or the preceding vehicle with respect to t, is less than a predetermined threshold value $\Delta V_\alpha$. In the event of $(Vf-Vf_{old}) < \Delta V_\alpha$, the routine proceeds from step S109 to step S110. In the event of $(Vf-Vf_{old}) \geq \Delta V_\alpha$, the routine proceeds from step S109 to step S111. In the system of the second embodiment, the predetermined threshold value $\Delta V_\alpha$ is set to 1.0G (G denotes a gravitational acceleration unit). This set value, that is, 1.0G is a physically possible maximum variation of the velocity Vf of the preceding vehicle. Therefore, in case of $(Vf-Vf_{old}) \geq \Delta V_\alpha$, the ECU determines that the object detected or captured by object detector 31 is shifted or changed to another object. In this case, at step S111, a continuous object-detection flag conflg is cleared to "0". Setting (=1) of continuous object-detection flag conflg means that the object detector continuously detects the frontally positioned object. Resetting (=0) of continuous object-detection flag conflg means that the object detector does not continuously detect the frontally positioned object. At the same time, at step S111, the previous velocity $Vf_{old}$ is set at a predetermined excessively high value such as 1000 which cannot be attained by the preceding vehicle. After step S111, step S112 occurs.

In contrast, when the answer to step S109 is affirmative (i.e., $(Vf-Vf_{old}) < \Delta V_\alpha$ and thus the ECU determines that the variation of velocity Vf of the frontally-positioned moving object or the preceding vehicle is the physically possible variation, step S110 occurs. At step S110, continuous object-detection flag conflg is set to "1", and simultaneously the previous velocity $Vf_{old}$ is updated by the current velocity Vf. After step S110, step S112 occurs.

Returning to step S105, when the answer to step S105 is affirmative (YES), the routine proceeds from step S105 to step S106. At step S106, a check is made to determine whether or not continuous object-detection flag conflg is set. In case of conflg=1, in other words, when the frontally positioned object detected by object detector 31 is continuously held stationary, the routine proceeds from step S106 to step S112. In case of conflg=0, in other words, when a frontally positioned object currently detected by object detector 31 is not the object which is initially detected and continuously held stationary, the routine proceeds from step S106 to step S107. Taking into account the detection accuracy of object detector 31, at step S107, the operating mode of the system of the second embodiment is set to a supplementary brake-application control disabled mode. Then, the program returns to step S101.

At step S112, in the same manner as step S5, a target deceleration rate Gx*, needed to avoid the host vehicle from being brought into collision-contact with the preceding vehicle (or the frontally located object), is arithmetically calculated based on the host vehicle speed data Vm extracted through step S102, the relative distance data L extracted through step S103, and the time rate of change dL/dt calculated through step S104, from the following expression (1).

$$Gx^* = \{Vm^2 - (Vm - dL/dt)^2\}/2L \qquad (1)$$

At step S113, target braking pressure Pt is computed or retrieved based on target deceleration rate Gx*.

At step S114, actual braking pressure Pr is detected or estimated based on fluid pressures $P_{w1}$ and $P_{w2}$ from first and second pressure sensors 32 and 33.

At step S115, a check is made to determine whether target braking pressure Pt is greater than actual braking pressure Pr. In case of Pt>Pr, that is, when there is a lack of the deceleration rate created by the driver's braking action or when there is no driver's braking action, the routine proceeds from step S115 to step S116. Conversely, in case of Pt≦Pr, that is, in case of an adequate driver's braking action, the routine proceeds from step S115 to step S119. At step S119, the operating mode of the system of the second embodiment is set to the supplementary brake-application control disabled mode.

At step S116, a test is made to determine whether lane-changing indicative flag LC, which is based on the result of the decision routine of FIG. 4, is set or reset. In case of LC=1, the routine flows from step S116 to step S118. In case of LC=0, the routine flows from step S116 to step S117.

At step S117, the operating mode of the system of the second embodiment is set to a supplementary brake-application control enabled mode with no limitation. That is, when the supplementary brake-application control enabled mode with no limitation is selected at step S117, electronically-controlled vacuum brake booster 24 is operated so that actual braking pressure Pr is brought closer to target braking pressure Pt based on target deceleration rate Gx* calculated through step S112 and thus the braking pressure is built up for the purpose of supplementary braking control function.

At step S118, the operating mode of the system of the second embodiment is set to a supplementary brake-application control enabled mode with a limitation. That is, compensated target braking pressure Pt*, which is obtained by decreasingly compensating for target braking pressure Pt, is used to properly suppress the supplementary braking control. Compensated target braking pressure Pt* is arithmetically calculated based on target braking pressure Pt computed through step S113, from the following expression (6).

$$Pt^* = k_1 \times k_2 \times Pt \qquad (6)$$

where $k_1$ denotes a time-to-collision dependent gain, and $k_2$ denotes a relative-angle dependent gain.

Figure 15:
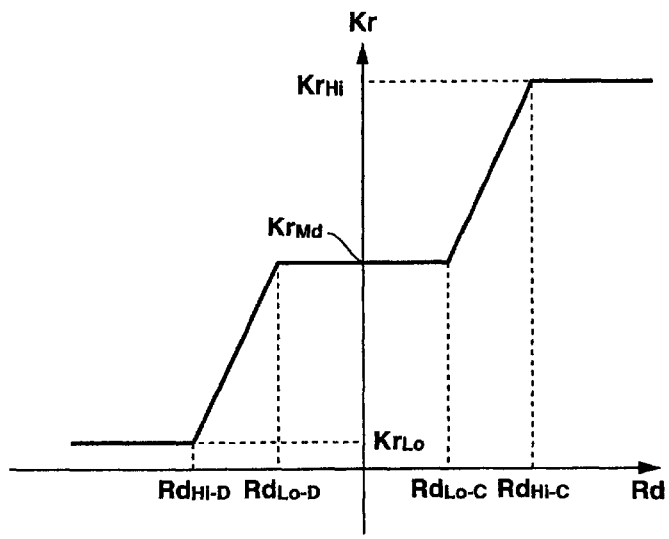
FIG. 15 is a preprogrammed characteristic map showing the relationship between the time-to-collision TC and a time-to-collision dependent gain $k_1$, used for arithmetic-calculation of a compensated target braking pressure Pt*.
Figure 16:
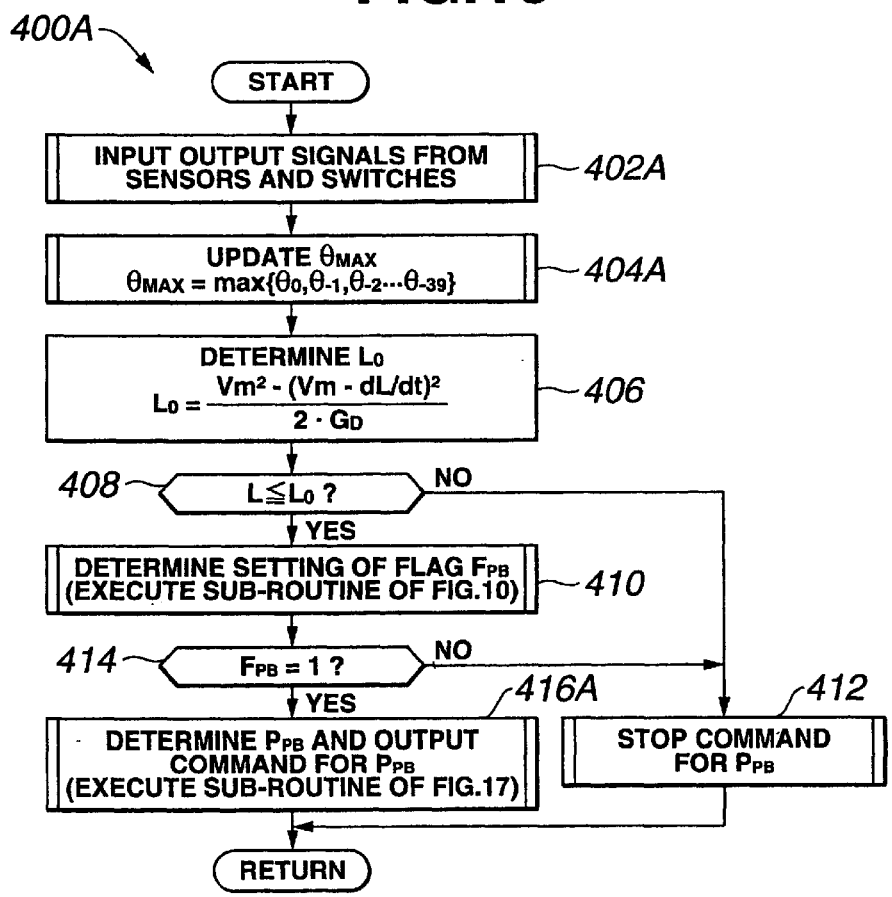
FIG. 16 is a preprogrammed characteristic map showing the relationship between the relative angle θ and a relative-angle dependent gain $k_2$ used for arithmetic-calculation of compensated target braking pressure Pt*.
Figure 17:
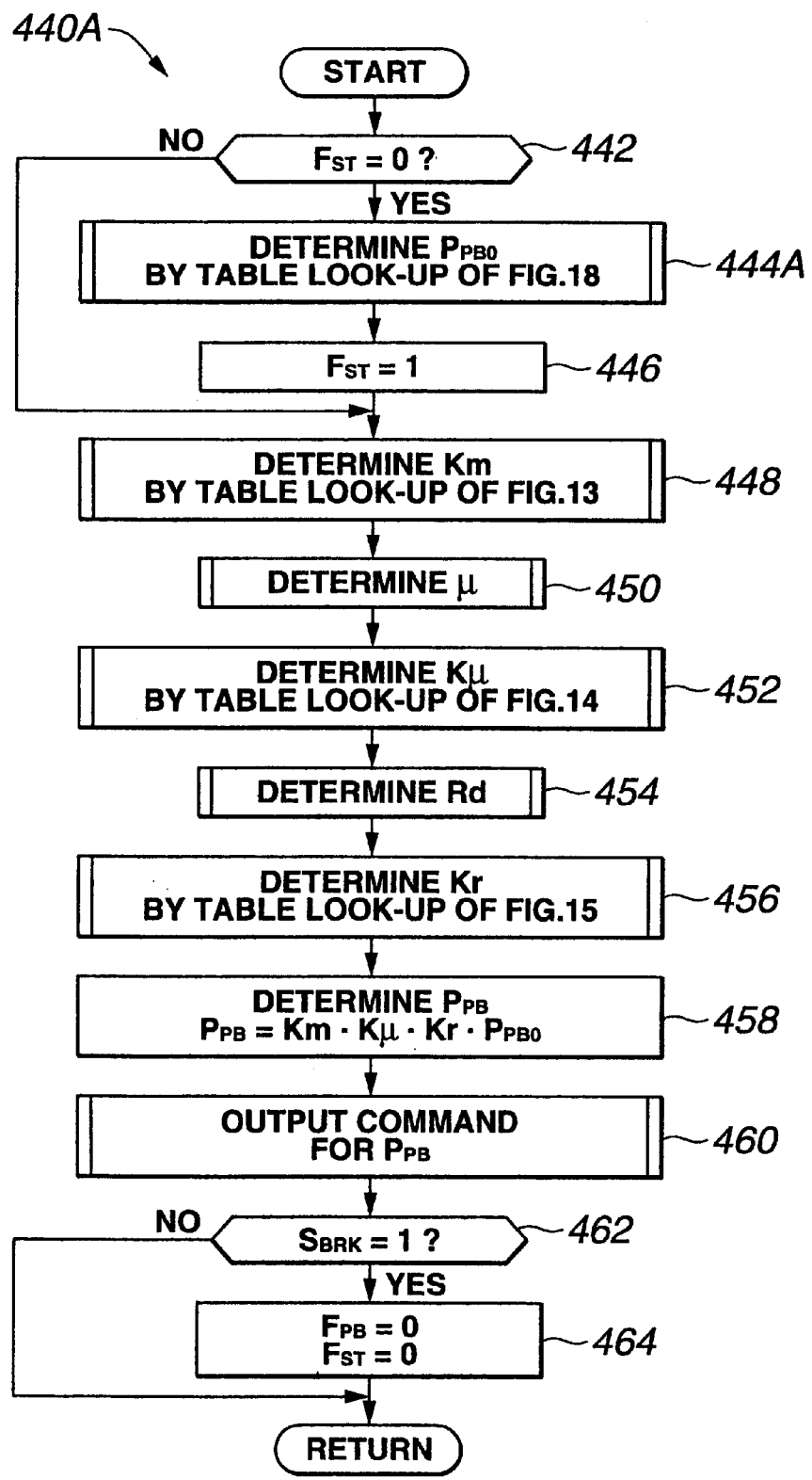
Figure 18:
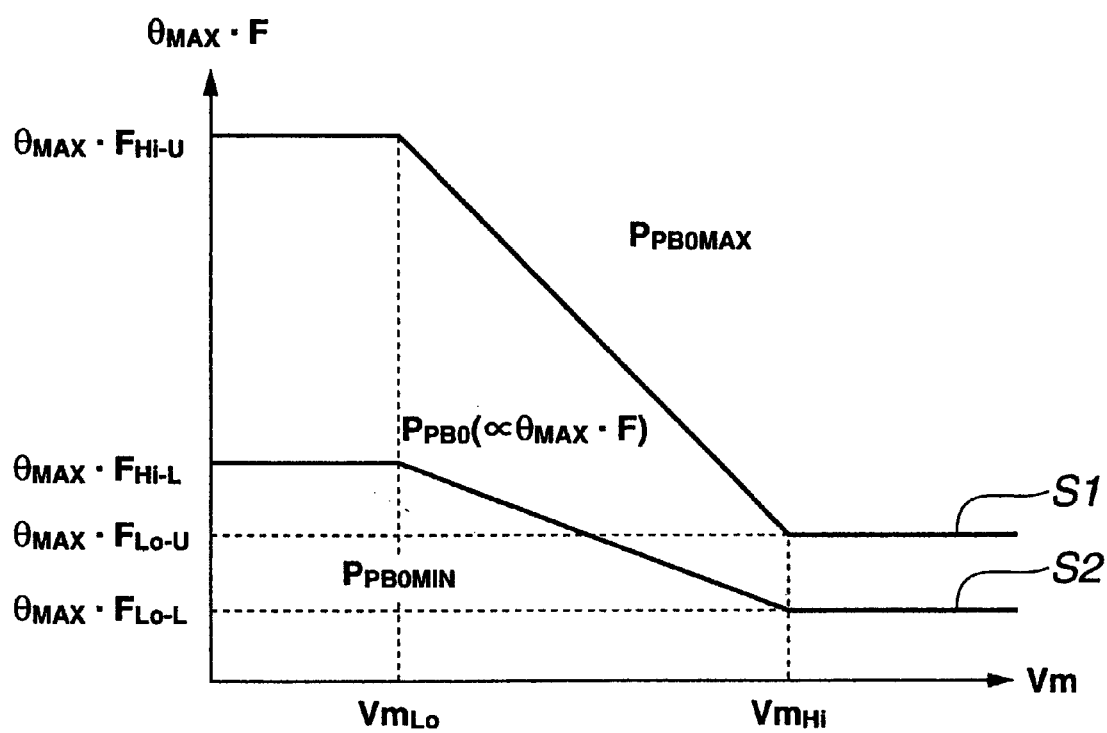

In the shown embodiment, time-to-collision dependent gain $k_1$ is map-retrieved based on time-to-collision TC (calculated through step S55 of the decision routine of FIG. 4), from the preprogrammed characteristic map of FIG. 15 showing how gain $k_1$ has to be varied relative to time-to-collision TC. As clearly shown in FIG. 15, within a comparatively shorter time-to-collision area, gain $k_1$ is set to its maximum value such as "1". Gain $k_1$ tends to decrease, as the time-to-collision increases. On the other hand, relative-angle dependent gain $k_2$ is map-retrieved based on relative angle θ, from the preprogrammed characteristic map of FIG. 16 showing how gain $k_2$ has to be varied relative to relative angle θ. As clearly shown in FIG. 16, within a comparatively smaller relative-angle area, gain $k_2$ is set to its maximum value such as "1". Gain $k_2$ tends to decrease, as relative angle θ increases. The preprogrammed characteristic curves shown in FIGS. 15 and 16 are based on the assumption that the longer the time-to-collision TC and/or the greater the relative angle θ, the stronger the driver's intention for lane-changing. During the supplementary brake-application control enabled mode with a limitation, initiated at step S118 when actual braking pressure Pr is less than compensated target braking pressure Pt* (see step S115), electronically-controlled vacuum brake booster 24 is operated so that actual braking pressure Pr is brought closer to compensated target braking pressure Pt*, somewhat limited than target braking pressure Pt used for the supplementary brake-application control enabled mode with no limitation, initiated at step S117.

The automatic braking control system of the second embodiment operates as follows.

In the event that the host vehicle is approaching the preceding vehicle (or the frontally positioned object), target deceleration rate Gx*, needed to avoid the host vehicle from being brought into collision-contact with the preceding vehicle, is calculated. Target braking pressure Pt, needed to realize the target deceleration rate Gx* calculated, is computed. Only when actual braking pressure Pr is less than target braking pressure Pt, the supplementary brake-application control enabled mode (supplementary braking mode) is initiated so that the actual braking pressure is brought closer to the target braking pressure by electronically controlling the vacuum brake booster (see the flow from step S112 through steps S113–S116 to step S117 or S118 in FIG. 14). Concretely, during the supplementary brake-application control enabled mode, electromagnetic solenoid 5a is energized, vacuum valve 3 is closed and at the same time atmospheric valve 4 is opened, thereby permitting atmospheric pressure to enter variable pressure chamber 1. Thus, there is a differential pressure between the pressure in variable pressure chamber 1 and negative pressure chamber 2, and whereby hydraulic pressure develops in the master cylinder and thus brake fluid is forced through the brake-fluid lines to the wheel-brake cylinders.

According to the system of the second embodiment, two sorts of supplementary brake-application enabled modes, namely a limited supplementary brake-application enabled mode and an unlimited supplementary brake-application enabled mode, can be executed depending on whether lane-changing indicative flag LC is set or reset. When the lane-changing indicative flag is set (LC=1), the supplementary braking control is suppressed or limited (see step S118) and the limited supplementary brake-application enabled mode is initiated. Actually, a target braking pressure (Pt*) used during the limited supplementary brake-application enabled mode is decreasingly compensated for than a target braking pressure (Pt) used during the unlimited supplementary brake-application enabled mode. By properly selecting a better one from the two sorts of supplementary brake-application enabled modes depending on whether lane-changing indicative flag LC is set or reset, for example, in the presence of a driver's intention for lane-changing for obstacle-avoidance or in the presence of a driver's intention to pass the preceding vehicle, that is, in the absence of a driver's intention for braking or in case that the driver recognizes that a braking force higher than that created by the present driver's braking action is unnecessary, i.e., in case of LC=1, the automatic supplementary braking operation can be effectively suppressed or limited. Additionally, in the same manner as the first embodiment, according to the system of the second embodiment, it is possible to precisely determine the presence or absence of the driver's intention for lane-changing during cornering as well as during straight-ahead driving. Even when the host vehicle is approaching the preceding vehicle due to driver's inattentive driving, it is possible to engage or initiate the supplementary braking control function (see the flow from step S56 through steps S61–S64 to step S66 in FIG. 4), since there is an increased tendency for the deviation Δρ between curvatures $ρ_1$ and $ρ_2$, to be less than threshold value α1 during the driver's inattentive driving. Moreover, according to the system of the second embodiment, in order to match the driver's intention for lane-changing, compensated target braking pressure Pt*, used during the limited supplementary brake-application enabled mode in case of LC=1, is decreasingly compensated for, as time-to-collision TC and/or relative angle θ of the direction of the host vehicle's motion relative to the direction of the preceding vehicle's motion or relative to the object increases.

As will be appreciated from the above, in the automatic braking control system of each of the first and second embodiments, the tendency for the driver to feel uncomfortable owing to the automatic braking operation (the preliminary braking operation or the supplementary braking operation) in the presence of a driver's intention for lane-changing for obstacle-avoidance or in the presence of a driver's intention to pass the preceding vehicle, that is, in the absence of a driver's intention for braking is eliminated. In order to be able to enhance the decision accuracy for the presence or absence of a driver's intention for lane-changing, the steering angle and the host vehicle's relative angle relative to the frontally positioned object are compared to their threshold values, that is, $|δ|>α$ and $|θ|>β$. Additionally, taking account of a rate {L/(dL/dt)} of relative distance L with respect to time rate of change dL/dt, that is, time-to-collision TC representative of an elapsed time before the host vehicle is brought into collision-contact with the preceding vehicle or the frontally located object, the decision for the presence or absence of a driver's intention for lane-changing is made (see steps S57, S59, and S63, and FIG. 7). Furthermore, taking account of a relative distance L of the host vehicle relative to the frontally positioned object or the preceding vehicle, the decision for the presence or absence of a driver's intention for lane-changing is made (see steps S58, S60, and FIG. 9). Therefore, the decision accuracy for the presence or absence of a driver's intention for lane-changing can be enhanced. Additionally, by way of comparison between a deviation Δρ between first and second curvatures $ρ_1$ and $ρ_2$ and its deviation threshold value α1, the presence or absence of the driver's intention for lane-changing during cornering is determined (see steps S64). Thus, it is possible to precisely decide the presence or absence of the driver's intention for lane-changing even during cornering. The previously-noted deviation threshold value α1 is determined or map-retrieved based on rate {L/(dL/dt)} of relative distance L with respect to time rate of change dL/dt, that is, time-to-collision TC, and therefore it is possible to more precisely decide the presence or absence of the driver's intention for lane-changing during cornering. In case of the system of the second embodiment, taking account of rate {L/(dL/dt)} of relative distance L with respect to time rate of change dL/dt, that is, time-to-collision TC and/or the host vehicle's relative angle θ relative to the frontally positioned object, the automatic braking operation (i.e., the supplementary braking operation) can be properly suppressed or limited (see step S118, FIGS. 15 and 16). It is possible to precisely reflect the degree (the strength) of the driver's intention for lane-changing on the automatic braking control.

The entire contents of Japanese Patent Application Nos. P2001-001930 (filed Jan. 9, 2001) and P2000-247161 (filed Aug. 17, 2000) are incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A braking control system with object detection system interaction comprising:
    a relative-distance detector that detects a relative distance of a frontally positioned object relative to a host vehicle;
    a vehicle speed sensor that detects a host vehicle speed of the host vehicle;
    an automatic braking control unit configured to be electronically connected to at least the relative-distance detector and the vehicle speed sensor for automatically controlling, depending on both the relative distance and the host vehicle speed, a braking force needed for an automatic braking operation without driver's braking action when the host vehicle is approaching the frontally positioned object; the automatic braking control unit comprising:
    a detection section that detects the presence or absence of a driver's intention for lane-changing;
    the automatic braking control unit limiting the automatic braking operation in the presence of the driver's intention for lane-changing;
    a steering angle sensor that detects a steering angle of the host vehicle; and
    a relative-angle detector that detects a relative angle of a direction of motion of the host vehicle relative to a direction of motion of the frontally positioned object;
    the detection section determining the presence of the driver's intention for lane-changing when the steering angle exceeds a first threshold value and the relative angle exceeds a second threshold value,
    wherein the first threshold value decreases as a rate of the relative distance with respect to a time rate of change of the relative distance increases.

2. The braking control system as claimed in claim 1, which further comprises:
    a first curvature estimation section that estimates, based on the host vehicle speed and the steering angle, a first curvature corresponding to a curvature of a course of the host vehicle; and
    a second curvature estimation section that estimates, based on the relative distance and the relative angle, a second curvature corresponding to a curvature of an intended course for the host vehicle when the host vehicle is turning toward the frontally positioned object;
    wherein the detection section determines the presence of the driver's intention for lane-changing when a deviation between the first and second curvatures exceeds a third threshold value.

3. The braking control system as claimed in claim 2, wherein:
    the third threshold value decreases as a rate of the relative distance with respect to a time rate of change of the relative distance increases.

4. The braking control system as claimed in claim 1, wherein:
    a degree of the first threshold value on the automatic braking operation executed in the presence of the driver's intention for lane-changing decreases, as a rate of the relative distance with respect to a time rate of change of the relative distance increases.

5. The braking control system as claimed in claim 1, wherein:
    a degree of the first threshold value on the automatic braking operation executed in the presence of the driver's intention for lane-changing decreases, as the relative angle increases.

6. A braking control system with object detection system interaction comprising:
    a relative-distance detector that detects a relative distance of a frontally positioned object relative to a host vehicle;
    a vehicle speed sensor that detects a host vehicle speed of the host vehicle;
    an automatic braking control unit configured to be electronically connected to at least the relative-distance detector and the vehicle speed sensor for automatically controlling, depending on both the relative distance and the host vehicle speed, a braking force needed for an automatic braking operation without driver's braking action when the host vehicle is approaching the frontally positioned object; the automatic braking control unit comprising:
    a detection section that detects the presence or absence of a driver's intention for lane-changing;
    the automatic braking control unit limiting the automatic braking operation in the presence of the driver's intention for lane-changing;
    a steering angle sensor that detects a steering angle of the host vehicle; and
    a relative-angle detector that detects a relative angle of a direction of motion of the host vehicle relative to a direction of motion of the frontally positioned object;
    the detection section determining the presence of the driver's intention for lane-changing when the steering angie exceeds a first threshold value and the relative angle exceeds a second threshold value,
    wherein the second threshold value decreases as the relative distance increases.

7. The braking control system as claimed in claim 6, which further comprises:
    a first curvature estimation section that estimates, based on the host vehicle speed and the steering angle, a first curvature corresponding to a curvature of a course of the host vehicle; and
    a second curvature estimation section that estimates, based on the relative distance and the relative angle, a second curvature corresponding to a curvature of an intended course for the host vehicle when the host vehicle is turning toward the frontally positioned object;
    wherein the detection section determines the presence of the driver's intention for lane-changing when a deviation between the first and second curvatures exceeds a third threshold value.

8. The braking control system as claimed in claim 7, wherein:
the third threshold value decreases as a rate of the relative distance with respect to a time rate of change of the relative distance increases.

9. The braking control system as claimed in claim 6, wherein:
a degree of the first threshold value on the automatic braking operation executed in the presence of the driver's intention for lane-changing decreases, as a rate of the relative distance with respect to a time rate of change of the relative distance increases.

10. The braking control system as claimed in claim 6, wherein:
a degree of the first threshold value on the automatic braking operation executed in the presence of the driver's intention for lane-changing decreases, as the relative angle increases.

11. A braking control system with object detection system interaction comprising:
a relative-distance detector that detects a relative distance of a frontally positioned object relative to a host vehicle;
a vehicle speed sensor that detects a host vehicle speed of the host vehicle;
an automatic braking control unit configured to be electronically connected to at least the relative-distance detector and the vehicle speed sensor for automatically controlling, depending on both the relative distance and the host vehicle speed, a braking force needed for an automatic braking operation without driver's braking action when the host vehicle is approaching the frontally positioned object; the automatic braking control unit comprising:
a detection section that detects the presence or absence of a driver's intention for lane-changing;
the automatic braking control unit limiting the automatic braking operation in the presence of the driver's intention for lane-changing;
a steering angle sensor that detects a steering angle of the host vehicle;
a relative-angle detector that detects a relative angle of a direction of motion of the host vehicle relative to a direction of motion of the frontally positioned object;
a first curvature estimation section that estimates, based on the host vehicle speed and the steering angle, a first curvature corresponding to a curvature of a course of the host vehicle; and
a second curvature estimation section that estimates, based on the relative distance and the relative angle, a second curvature corresponding to a curvature of an intended course for the host vehicle when the host vehicle is turning toward the frontally positioned object;
wherein the detection section determines the presence of the driver's intention for lane-changing when a deviation between the first and second curvatures exceeds a third threshold value, and
wherein:
the first curvature is arithmetically calculated based on the host vehicle speed and the steering angle, from an expression:

$$\rho_1 = (1 + A \times Vm^2) \times 1_{WB} \times N/\delta$$

where Vm is the host vehicle speed, δ is the steering angle, A is a vehicle stability factor for the host vehicle, $1_{WB}$ is a wheel base of the host vehicle, and N is a steering gear ratio of the host vehicle; and
the second curvature is arithmetically calculated based on the relative distance and the relative angle, from an expression:

$$\rho_2 = L/(2 \times \sin \theta)$$

where L is the relative distance and θ is the relative angle.

12. The braking control system as claimed in claim 2, wherein:
the third threshold value decreases as a rate of the relative angle with respect to a time rate of change of the relative distance increases.

13. A braking control system with object detection system interaction comprising:
an object detection means for detecting a relative distance of a frontally positioned object relative to a host vehicle;
a vehicle speed detection means for detecting a host vehicle speed of the host vehicle;
an automatic braking control means configured to be electronically connected to at least the object detection means and the vehicle speed detection means for automatically controlling, depending on both the relative distance and the host vehicle speed, a braking force needed for an automatic braking operation—without driver's braking action when the host vehicle is approaching the frontally positioned object; the automatic braking control means comprising:
detection means for detecting the presence or absence of a driver's intention for lane-changing;
the automatic braking control means limiting the automatic braking operation in the presence of the driver's intention for lane-changing;
a steering angle sensor that detects a steering angle of the host vehicle; and
a relative-angle detector that detects a relative angle of a direction of motion of the host vehicle relative to a direction of motion of the frontally positioned object;
the detection means determining the presence of the driver's intention for lane-changing when the steering angle exceeds a first threshold value and the relative angle exceeds a second threshold value,
wherein the first threshold value decreases as a rate of the relative distance with respect to a time rate of change of the relative distance increases.

14. The braking control system as claimed in claim 13, wherein the second threshold value decreases as the relative distance increases.

15. An automatic preliminary braking control system with object detection system interaction comprising:
a relative-distance detector that detects a relative distance of a frontally positioned object relative to a host vehicle;
a vehicle speed sensor that detects a host vehicle speed of the host vehicle;
a brake switch whose signal indicates if a brake pedal is depressed;
an accelerator stroke sensor that detects an accelerator opening;
an automatic braking control unit configured to be electronically connected to at least the relative-distance detector, the vehicle speed sensor, the brake switch and the accelerator stroke sensor for automatically controlling, depending on the relative distance, the host vehicle speed, the signal from the brake switch and the accelerator opening, a braking force needed for preliminary braking control initiated prior to driver's braking action when the host vehicle is approaching the frontally positioned object; the automatic braking control unit comprising:

a target deceleration rate calculation section that calculates a target deceleration rate, needed to avoid the host vehicle from being brought into collision-contact with the frontally positioned object, from an expression:

$$Gx^* = \{Vm^2 - (Vm - dL/dt)^2\}/2L$$

where Gx* is the target deceleration rate, Vm is the host vehicle speed, L is the relative distance, and dL/dt is a time rate of change of the relative distance;

a comparison section that determines whether the target deceleration rate is greater than or equal to a predetermined deceleration-rate threshold value; and a detection section that detects the presence or absence of a driver's intention for lane-changing;

the automatic braking control unit inhibiting the preliminary braking control, when either of (i) a condition that the brake pedal is undepressed, (ii) a condition that the accelerator opening is less than or equal to a predetermined threshold value substantially corresponding to a closed position of an accelerator, (iii) a condition that the target deceleration rate is greater than or equal to the predetermined deceleration-rate threshold value, and (iv) a condition that the driver's intention for lane-changing is absent, is unsatisfied.

16. The automatic preliminary braking control system as claimed in claim 15, which further comprises:

a steering angle sensor that detects a steering angle of the host vehicle;

a relative-angle detector that detects a relative angle of a direction of motion of the host vehicle relative to a direction of motion of the frontally positioned object; and a decision section that determines, based on a product of the steering angle and the relative angle, if a driver's lane-changing operation is initiated;

wherein the decision section determines that the driver's lane-changing operation is initiated during straight-ahead driving when the product is less than a predetermined negative value, and wherein the detection section determines the presence of the driver's intention for lane-changing during straight-ahead driving when the steering angle exceeds a first threshold value and the relative angle exceeds a second threshold value.

17. The automatic preliminary braking control system as claimed in claim 15, which further comprises:

a steering angle sensor that detects a steering angle of the host vehicle;

a relative-angle detector that detects a relative angle of a direction of motion of the host vehicle relative to a direction of motion of the frontally positioned object;

a first curvature estimation section that estimates, based on the host vehicle speed and the steering angle, a first curvature corresponding to a curvature of a course of the host vehicle; and a second curvature estimation section that estimates, based on the relative distance and the relative angle, a second curvature corresponding to a curvature of an intended course for the host vehicle when the host vehicle is turning toward the frontally positioned object; and a decision section that determines, based on a product of the steering angle and the relative angle, if a driver's lane-changing operation is initiated;

wherein the decision section determines that the driver's lane-changing operation is initiated during cornering when the product is greater than a predetermined positive value, and wherein the detection section determines the presence of the driver's intention for lane-changing during cornering when a deviation between the first and second curvatures exceeds a third threshold value.

18. The automatic preliminary braking control system as claimed in claim 17, wherein:

the first curvature is arithmetically calculated based on the host vehicle speed and the steering angle, from an expression:

$$\rho_1 = (1 + A \times Vm^2) \times l_{WB} \times N/\delta$$

where Vm is the host vehicle speed, $\delta$ is the steering angle, A is a vehicle stability factor for the host vehicle, $l_{WB}$ is a wheel base of the host vehicle, and N is a steering gear ratio of the host vehicle; and the second curvature is arithmetically calculated based on the relative distance and the relative angle, from an expression:

$$\rho_2 = L/(2 \times \sin \theta)$$

where L is the relative distance and $\theta$ is the relative angle.

19. An automatic supplementary braking control system with object detection system interaction comprising:

a relative-distance detector that detects a relative distance of a frontally positioned object relative to a host vehicle;

a vehicle speed sensor that detects a host vehicle speed of the host vehicle;

a pressure sensor that detects an actual braking pressure;

an automatic braking control unit configured to be electronically connected to at least the relative-distance detector, the vehicle speed sensor and the pressure sensor for automatically controlling, depending on the relative distance, the host vehicle speed and the actual braking pressure, a braking force needed for supplementary braking control through which a value of a controlled quantity is brought closer to a target deceleration rate needed for collision-avoidance when the host vehicle is approaching the frontally positioned object; the automatic braking control unit comprising:

a target deceleration rate calculation section that calculates the target deceleration rate, needed to avoid the host vehicle from being brought into collision-contact with the frontally positioned object, from an expression:

$$Gx^* = \{Vm^2 - (Vm - dL/dt)^2\}/2L$$

where Gx* is the target deceleration rate, Vm is the host vehicle speed, L is the relative distance, and dL/dt is a time rate of change of the relative distance;

a computation section that computes a target braking pressure based on the target deceleration rate;

a comparison section that determines whether the actual braking pressure is less than the target braking pressure; and a detection section that detects the presence or absence of a driver's intention for lane-changing;

the automatic braking control unit decreasingly compensating for the target braking pressure for limiting the supplementary braking control, when (i) a condition that the actual braking pressure is less than the target braking pressure and (ii) a condition that the driver's intention for lane-changing is present, are both satisfied.

20. The automatic supplementary braking control system as claimed in claim 19, which further comprises:
a steering angle sensor that detects a steering angle of the host vehicle;
a relative-angle detector that detects a relative angle of a direction of motion of the host vehicle relative to a direction of motion of the frontally positioned object; and
a decision section that determines, based on a product of the steering angle and the relative angle, if a driver's lane-changing operation is initiated;
wherein the decision section determines that the driver's lane-changing operation is initiated during straight-ahead driving when the product is less than a predetermined negative value, and
wherein the detection section determines the presence of the driver's intention for lane-changing during straight-ahead driving when the steering angle exceeds a first threshold value and the relative angle exceeds a second threshold value.

21. The automatic supplementary braking control system as claimed in claim 19, which further comprises:
a steering angle sensor that detects a steering angle of the host vehicle;
a relative-angle detector that detects a relative angle of a direction of motion of the host vehicle relative to a direction of motion of the frontally positioned object;
a first curvature estimation section that estimates, based on the host vehicle speed and the steering angle, a first curvature corresponding to a curvature of a course of the host vehicle; and
a second curvature estimation section that estimates, based on the relative distance and the relative angle, a second curvature corresponding to a curvature of an intended course for the host vehicle when the host vehicle is turning toward the frontally positioned object; and
a decision section that determines, based on a product of the steering angle and the relative angle, if a driver's lane-changing operation is initiated;
wherein the decision section determines that the driver's lane-changing operation is initiated during cornering when the product is greater than a predetermined positive value, and
wherein the detection section determines the presence of the driver's intention for lane-changing during cornering when a deviation between the first and second curvatures exceeds a third threshold value.

22. The automatic supplementary braking control system as claimed in claim 21, wherein:
the first curvature is arithmetically calculated based on the host vehicle speed and the steering angle, from an expression:

$$\rho_1 = (1 + A \times Vm^2) \times l_{WB} \times N/\delta$$

where Vm is the host vehicle speed, $\delta$ is the steering angle, A is a vehicle stability factor for the host vehicle, $l_{WB}$ is a wheel base of the host vehicle, and N is a steering gear ratio of the host vehicle; and
the second curvature is arithmetically calculated based on the relative distance and the relative angle, from an expression:

$$\rho_2 = L/(2 \times \sin\theta)$$

where L is the relative distance and $\theta$ is the relative angle.

23. A method for automatically controlling a braking force needed for an automatic braking operation without driver's braking action when a host vehicle is approaching a frontally positioned object, the method comprising:
detecting a host vehicle speed;
detecting a relative distance of the frontally positioned object relative to the host vehicle;
detecting a signal from a brake switch;
detecting an accelerator opening;
detecting an actual braking pressure;
calculating a time rate of change of the relative distance;
calculating a target deceleration rate based on the host vehicle speed, the relative distance, and the rate of change of the relative distance;
computing a target braking pressure based on the target deceleration rate;
detecting the presence or absence of a driver's intention for lane-changing;
inhibiting preliminary braking control initiated prior to driver's braking action, when either of (i) a condition that the brake pedal is undepressed, (ii) a condition that the accelerator opening is less than or equal to a predetermined threshold value substantially corresponding to a closed position of an accelerator, (iii) a condition that the target deceleration rate is greater than or equal to a predetermined deceleration-rate threshold value, and (iv) a condition that the driver's intention for lane-changing is absent, is unsatisfied;
decreasingly compensating for the target braking pressure for limiting supplementary braking control, when (v) a condition that the actual braking pressure is less than the target braking pressure and (vi) a condition that the driver's intention for lane-changing is present, are both satisfied;
detecting a steering angle of the host vehicle;
detecting a relative angle of a direction of motion of the frontally positioned object; and
determining the presence of the driver's intention for lane-changing when the steering angle exceeds a first threshold value and the relative angle exceeds a second threshold value,
wherein the first threshold value decreases as a rate of the relative distance with respect to a time rate of change of the relative distance increases.

24. The method as claimed in claim 23, wherein the second threshold value decreases as the relative distance increases.

* * * * *